(12) United States Patent
Su et al.

(10) Patent No.: US 11,895,416 B2
(45) Date of Patent: Feb. 6, 2024

(54) ELECTRO-OPTICAL TRANSFER FUNCTION CONVERSION AND SIGNAL LEGALIZATION

(71) Applicant: Dolby Laboratories Licensing Corporation, San Francisco, CA (US)

(72) Inventors: Guan-Ming Su, Fremont, CA (US); Harshad Kadu, Santa Clara, CA (US); Neeraj J. Gadgil, Pune (IN); Qing Song, Sunnyvale, CA (US); Yoon Yung Lee, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 115 days.

(21) Appl. No.: 17/630,901

(22) PCT Filed: Jul. 27, 2020

(86) PCT No.: PCT/US2020/043789
§ 371 (c)(1),
(2) Date: Jan. 27, 2022

(87) PCT Pub. No.: WO2021/021762
PCT Pub. Date: Feb. 4, 2021

(65) Prior Publication Data
US 2022/0295020 A1 Sep. 15, 2022

Related U.S. Application Data

(60) Provisional application No. 62/880,266, filed on Jul. 30, 2019.

(30) Foreign Application Priority Data

Jul. 30, 2019 (EP) ..................................... 19189052

(51) Int. Cl.
*H04N 25/615* (2023.01)
*H04N 19/186* (2014.01)
(Continued)

(52) U.S. Cl.
CPC ......... *H04N 25/6153* (2023.01); *G06T 5/009* (2013.01); *G06T 5/40* (2013.01);
(Continued)

(58) Field of Classification Search
CPC ...... H04N 19/186; H04N 19/46; H04N 19/30; H04N 19/85; H04N 19/154; H04N 19/98;
(Continued)

(56) References Cited

U.S. PATENT DOCUMENTS 8,437,053 B2 * 5/2013 Edge .................... H04N 1/6058
382/167
8,811,490 B2 8/2014 Su
(Continued)

FOREIGN PATENT DOCUMENTS

WO 2019023202 W 1/2019

OTHER PUBLICATIONS

ITU-R BT.2100-0, "Image Parameter Values for High Dynamic Range Television for use in Production and International Programme Exchange" Jul. 2016.
(Continued)

*Primary Examiner* — Pritham D Prabhakher

(57) ABSTRACT

A device includes an electronic processor configured to define a first set of sample pixels from a set of sample pixels determined from received video data according to a first electro-optical transfer function (EOTF) in a first color representation of a first color space; convert the first set of sample pixels to a second EOTF via a mapping function, producing a second set of sample pixels according to the second EOTF; convert the first and second set of sample pixels from the first color representation to a second color representation of the first color space; determine a backward reshaping function by repeatedly applying and adjusting a sample backward reshaping function so as to minimize a difference between predicted pixel values obtained by applying the sample backward reshaping function to the pixels of the converted first set and the pixels of the converted second set.

27 Claims, 10 Drawing Sheets

(51) Int. Cl.
*H04N 19/98* (2014.01)
*G06T 7/90* (2017.01)
*G06T 5/00* (2006.01)
*G06T 5/40* (2006.01)

(52) U.S. Cl.
CPC ............. *G06T 7/90* (2017.01); *H04N 19/186* (2014.11); *H04N 19/98* (2014.11)

(58) Field of Classification Search
CPC ...... H04N 1/60; H04N 25/6153; G06T 5/009; G06T 5/40; G06T 5/50; G06T 7/90; G06T 2207/10024; G06T 2207/10016
USPC ........................................................ 348/222.1
See application file for complete search history.

(56) References Cited

U.S. PATENT DOCUMENTS

| | | | | |
|---|---|---|---|---|
| 9,584,701 | B2* | 2/2017 | Kelly | H04N 19/00 |
| 10,223,774 | B2* | 3/2019 | Kadu | G06T 9/00 |
| 10,264,287 | B2 | 4/2019 | Wen | |
| 10,368,099 | B2* | 7/2019 | Sole Rojals | H04N 19/30 |
| 10,397,586 | B2* | 8/2019 | Su | H04N 19/14 |
| 10,462,407 | B2* | 10/2019 | Kozuka | H04N 11/24 |
| 10,757,428 | B2* | 8/2020 | Guo | H04N 19/136 |
| 11,184,508 | B2* | 11/2021 | Thebault | H04N 1/60 |
| 11,263,731 | B2* | 3/2022 | Thebault | G06T 5/009 |
| 2012/0177103 | A1* | 7/2012 | Fu | H04N 19/176 |
| | | | | 375/E7.076 |
| 2015/0078661 | A1* | 3/2015 | Granados | G06T 5/50 |
| | | | | 382/167 |
| 2016/0125579 | A1* | 5/2016 | Song | G06T 5/008 |
| | | | | 382/261 |
| 2016/0373613 | A1* | 12/2016 | Kelly | G06T 9/00 |
| 2017/0111643 | A1* | 4/2017 | Bugdayci Sansli | H04N 19/184 |
| 2017/0251211 | A1* | 8/2017 | Froehlich | H04N 19/124 |
| 2017/0289555 | A1 | 10/2017 | Su | |
| 2017/0308996 | A1 | 10/2017 | Kadu | |
| 2018/0007356 | A1* | 1/2018 | Kadu | H04N 19/117 |
| 2018/0048845 | A1 | 2/2018 | Kozuka | |
| 2018/0048913 | A1* | 2/2018 | Sole Rojals | H04N 19/30 |
| 2018/0098094 | A1 | 4/2018 | Wen | |
| 2018/0131938 | A1* | 5/2018 | Lu | H04N 9/67 |
| 2020/0120345 | A1* | 4/2020 | Guo | H04N 19/46 |

OTHER PUBLICATIONS

SMPTE 2084 "High Dynamic Range Electro-Optical Transfer Function of Mastering Reference Displays" 2014.

* cited by examiner

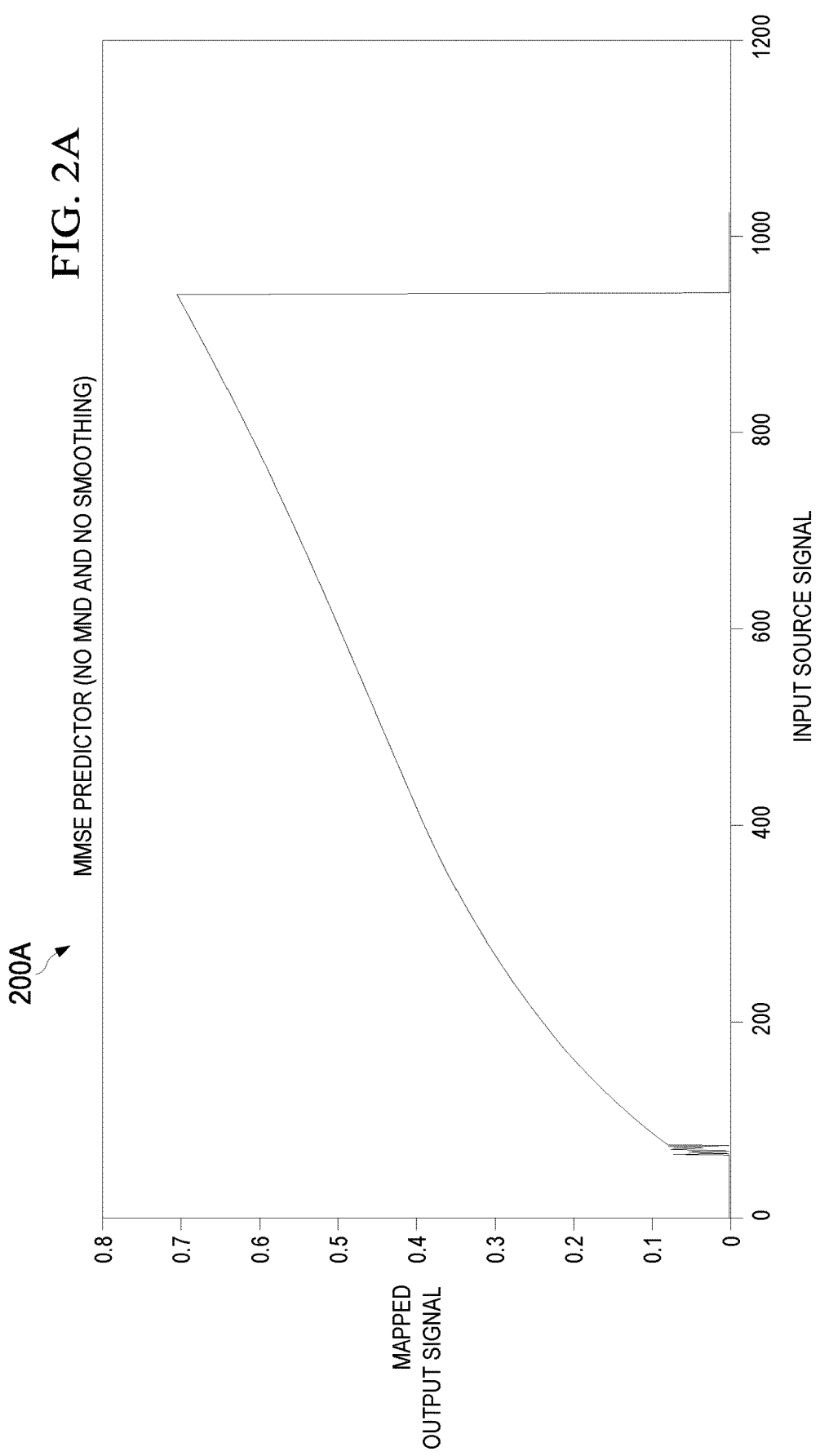

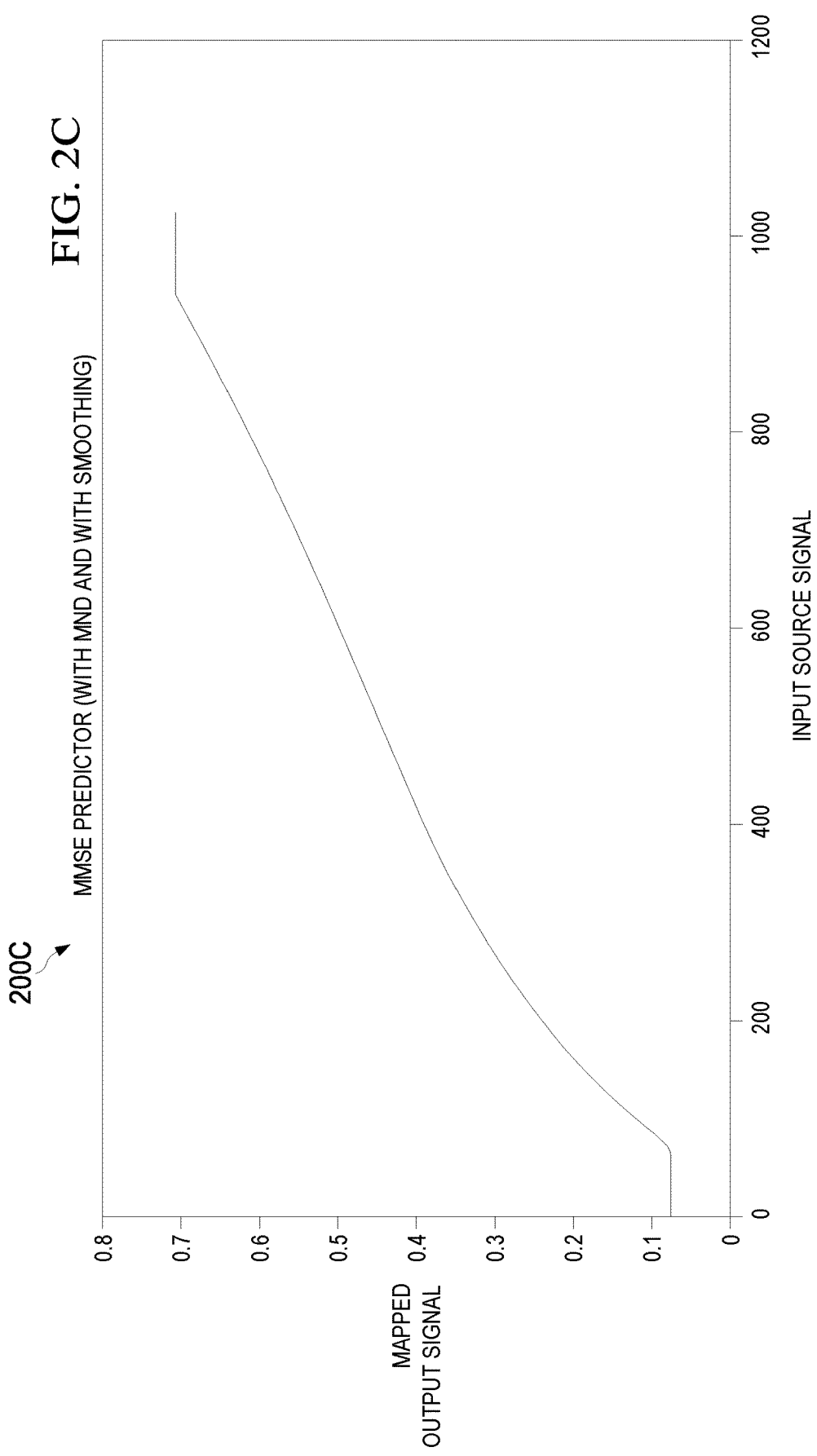

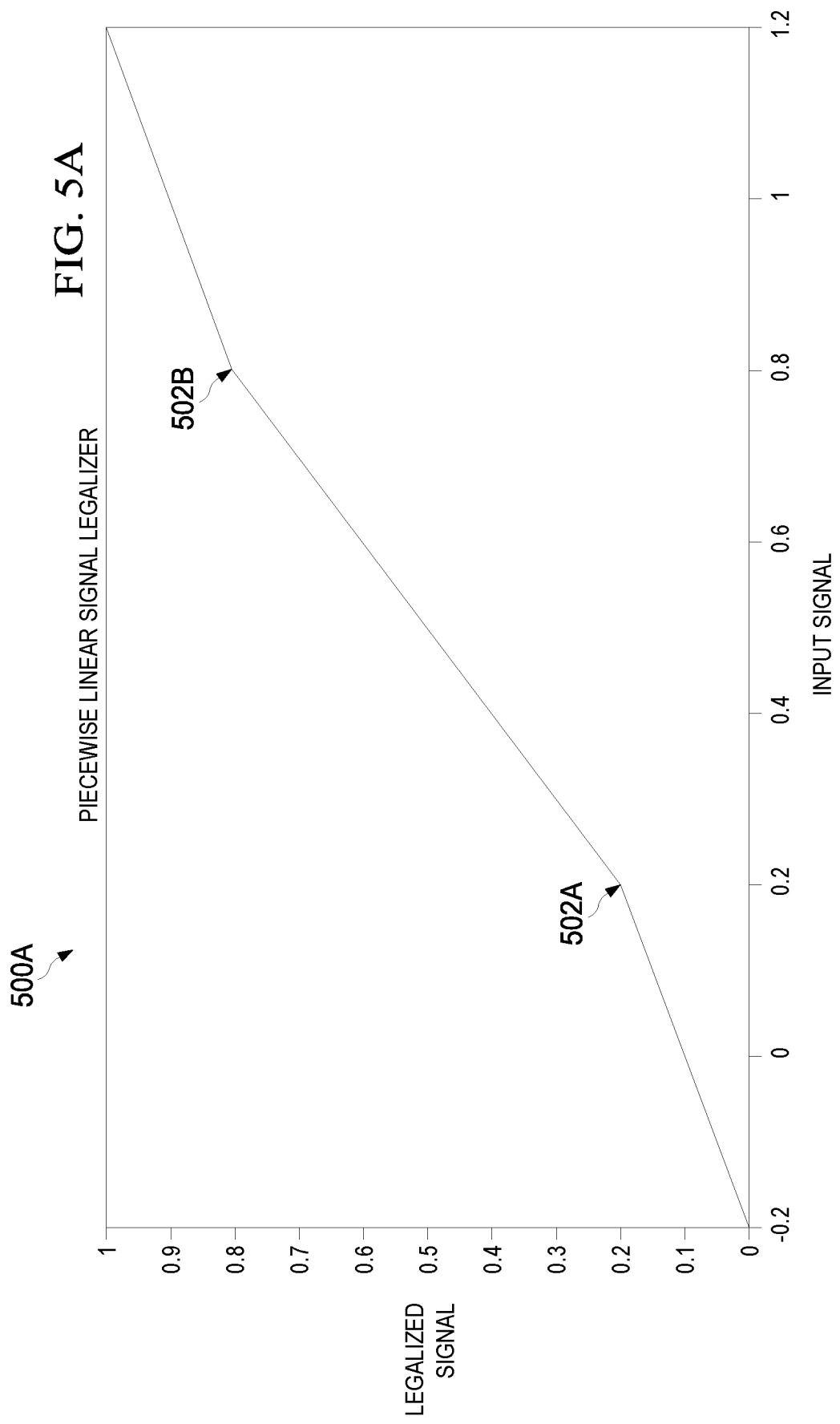

ELECTRO-OPTICAL TRANSFER FUNCTION CONVERSION AND SIGNAL LEGALIZATION

CROSS-REFERENCE TO RELATED APPLICATIONS

This application claims priority to U.S. Provisional Patent Application No. 62/880,266, filed Jul. 30, 2019 and European Patent Application No. 19189052.4, filed Jul. 30, 2019, each of which is hereby incorporated by reference in its entirety.

BACKGROUND

Field of the Disclosure

This application relates generally to video signal conversion for high dynamic range video (HDR).

Description of Related Art

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr), where each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT.1886 defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein. Herein, BT.1886, Rec. 2020, BT.2100, and the like refer to sets of definitions for various aspects of HDR video promulgated by the International Telecommunication Union (ITU).

Most consumer desktop displays currently support luminance of 200 to 300 cd/m² or nits. Most consumer HDTVs range from 300 to 500 nits with some models reaching 1000 nits (cd/m²). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays." In general, without limitation, the methods of the present disclosure relate to any dynamic range.

As used herein, the term "forward reshaping" denotes the process of mapping (or quantizing) an image from its original bit depth and coding format (e.g., gamma or SMPTE 2084) to an image of a lower or the same bit depth and a different coding format, which allows for improved compression using a coding method (such as AVC, HEVC, and the like). In a receiver, after decompressing the reshaped signal, the receiver may apply an inverse reshaping function to restore the signal to its original high dynamic range. Receivers may receive the backward reshaping function as a look-up table (LUT) or in parametric form, e.g., as the coefficients of a multi-piece polynomial approximation of the function.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY OF THE DISCLOSURE

Various aspects of the present disclosure relate to systems and methods for improved electro-optical transfer function conversion, signal legalization, and backward reshaping function.

In one exemplary aspect of the present disclosure, there is provided a device. The device includes an electronic processor. The device is for determining a backward reshaping function for rendering video on a target display.

The electronic processor is configured to determine a set of sample pixels from received video data; define, from the set of sample pixels, a first set of sample pixels according to a first electro-optical transfer function in a first color representation of a first color space; convert the first set of sample pixels to a second electro-optical transfer function in the first color representation of the first color space via a mapping function, producing, from the first set of sample pixels, a second set of sample pixels according to the second electro-optical transfer function; convert the first set of sample pixels and the second set of sample pixels from the first color representation to a second color representation of the first color space; and determine a backward reshaping function based on the converted first set of sample pixels and the converted second set of sample pixels. The electronic processor is configured to determine the backward reshaping function by repeatedly applying and adjusting a sample backward reshaping function so as to minimize a difference between predicted pixel values obtained by applying the sample backward reshaping function to the pixels in the converted first set of sample pixels and the pixelx in the converted second set of sample.

In another exemplary aspect of the present disclosure, the device may be implemented as or with a method for converting a signal and/or a non-transitory computer-readable medium storing instructions that, when executed by a processor of a computer, cause the computer to perform operations.

Various aspects of the present disclosure may provide for improvements in the speed of conversion, the efficiency of conversion, the accuracy of conversion, and the like. In this manner, various aspects of the present disclosure provide for the conversion of images and improvements in at least the technical fields of HDR-TV image rendering, signal processing, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate aspects, and explain various principles and advantages of those aspects.

FIG. 2A is a plot illustrating the output of an example prediction algorithm according to various aspects of the present disclosure.

FIG. 2C is a plot illustrating the output of an example prediction algorithm according to various aspects of the present disclosure.

FIG. 5A is a plot of an exemplary piecewise equation for signal legalization according to various aspects of the present disclosure.

Figure 1A:
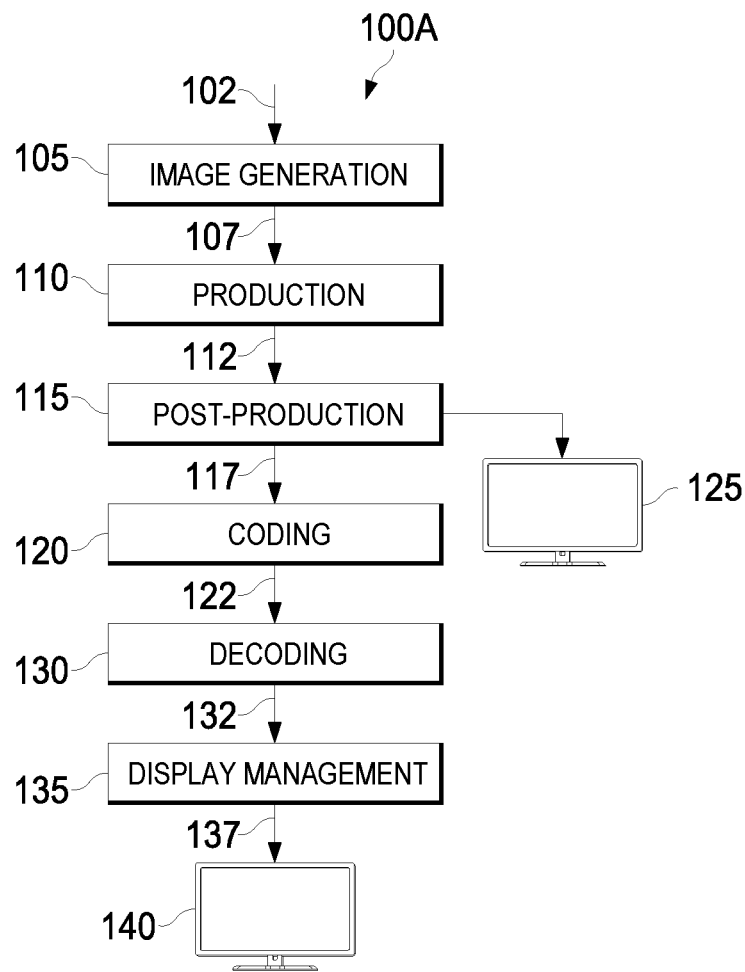
FIG. 1A is an exemplary process of a video delivery pipeline according to various aspects of the present disclosure.

Skilled artisans will appreciate that elements in the figures are illustrated for clarity and have not necessarily been drawn to scale. For example, the dimensions of some of the elements in the figures may be exaggerated relative to other elements to help to improve understanding of aspects of the present disclosure.

The apparatus and method components have been represented where appropriate by symbols in the drawings, showing only those specific details that are pertinent to understanding the aspects of the present disclosure so as not to obscure the disclosure with details that will be readily apparent to those of ordinary skill in the art having the benefit of the description herein.

DETAILED DESCRIPTION

Overview

This overview presents a basic description of some aspects of the present disclosure. It should be noted that this overview is not an extensive or exhaustive summary of aspects of the present disclosure. Moreover, it should be noted that this overview is not intended to be understood as identifying any particularly significant aspects or elements of the present disclosure, nor as delineating any scope of the aspects in particular, nor the disclosure in general. This overview merely presents some concepts that relate to the example aspects in a condensed and simplified format, and should be understood as merely a conceptual prelude to a more detailed description of aspects that follows below. Note that, although separate aspects are discussed herein, any combination of aspects and/or partial aspects discussed herein may be combined.

Techniques as described herein can be used to minimize requirements for memory bandwidth, data rate, and/or computational complexity in video applications, which may include the display of video content and/or the streaming of video content between video streaming server(s) and video streaming client(s).

A video application as described herein may refer to any one or more of: video display applications, virtual reality (VR) applications, augmented reality (AR) applications, automobile entertainment applications, remote presence applications, display applications, and the like. Example video content may include, but is not limited to, any one or more of: audiovisual programs, movies, video programs, TV broadcasts, computer games, AR content, VR content, automobile entertainment content, and the like.

Example video streaming clients may include, but are not necessarily limited to, any one or more of: display devices, a computing device with a near-eye display, a head-mounted display (HMD), a mobile device, a wearable display device, a set-top box with a display such as television, a video monitor, and the like.

As used herein, a "video streaming server" may refer to one or more upstream devices that prepare and stream omnidirectional video content to one or more video streaming clients in order to render at least a portion (e.g., corresponding to a user's field of vision or viewport, etc.) of the omnidirectional video content on one or more displays. The displays on which the omnidirectional video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox™), general purpose personal computers, tablets, dedicated digital media receivers such as the Apple TV™ or the Roku™ box, etc.

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In some aspects of the present disclosure, mechanisms as described herein form a part of a media processing system, including but not limited to any or more of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radio-telephone, electronic book reader, point of sale terminal, desktop computer, computer workstation, computer server, computer kiosk, or various other kinds of terminals and media processing units. For ease of description, some or all of the example systems presented herein are illustrated with a single exemplar of each of its component parts. Some examples may not describe or illustrate all components of the systems. Other aspects of the present disclosure may include more or fewer of each of the illustrated components, may combine some components, or may include additional or alternative components.

Example Video Delivery Processing Pipeline

FIG. 1A depicts an example process of a video delivery pipeline 100A showing various stages from video capture to video content display. A sequence of video frames 102 is captured or generated using image generation block 105. Video frames 102 may be digitally captured (e.g. by a digital camera) or generated by a computer (e.g. using computer animation) to provide video data 107. Alternatively, video frames 102 may be captured on film by a film camera. The film is converted to a digital format to provide video data 107. In a production phase 110, video data 107 is edited to provide a video production stream 112.

The video data of production stream 112 is then provided to a processor at block 115 for post-production editing. Block 115 post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block 115 to yield a final version 117 of the production for distribution. During post-production editing 115, video images are viewed on a reference display 125.

Following post-production 115, video data of final production 117 may be delivered to encoding block 120 for delivering downstream to decoding and playback devices such as television sets, set-top boxes, movie theaters, and the like. In some aspects, coding block 120 may include audio and video encoders, such as those defined by ATSC, DVB, DVD, Blu-Ray, and other delivery formats, to generate coded bit stream 122. In a receiver, the coded bit stream 122 is decoded by decoding unit 130 to generate a decoded signal 132 representing an identical or close approximation of signal 117. The receiver may be attached to a target display 140 which may have completely different characteristics than the reference display 125. In that case, a display management block 135 may be used to map the dynamic range of decoded signal 132 to the characteristics of the target display 140 by generating display-mapped signal 137.

Additionally, optionally, or alternatively, the coded bit stream 122 is further encoded with image metadata including but not limited to backward reshaping metadata that can be used by downstream decoders to perform backward reshaping on the signal 117 in order to generate backward reshaped images identical to or approximating target HDR images that may be optimized for rendering on HDR display devices. In some aspects of the present disclosure, the target HDR images may be generated from the signal 117 using one or more conversion tools implementing inverse tone mapping, inverse display management, etc.

In some aspects of the present disclosure, the target HDR images may be directly generated from the video data 112 at post-production editing 115. During post-production editing 115, the target HDR images are viewed on a second reference display (not shown) that supports the high dynamic range by the same or a different colorist who is performing post-production editing operations on the target HDR images.

Signal Reshaping

Currently, many digital interfaces for video delivery, such as the Serial Digital Interface (SDI) are limited to 12 bits per pixel per component. Furthermore, many compression standards, such as H.264 (or AVC) and H.265 (or HEVC), are limited to 10-bits per pixel per component. Therefore, efficient encoding and/or quantization is required to support HDR content, with dynamic range from approximately 0.001 to 10,000 cd/m$^2$ (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In aspects of the present disclosure, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, (for example, which represents the response curve of a physical cathode ray tube (CRT) device and coincidently may have a very rough similarity to the way the human visual system responds, a PQ curve imitates the true visual response of the human visual system using a relatively simple functional model.

Figure 1B:
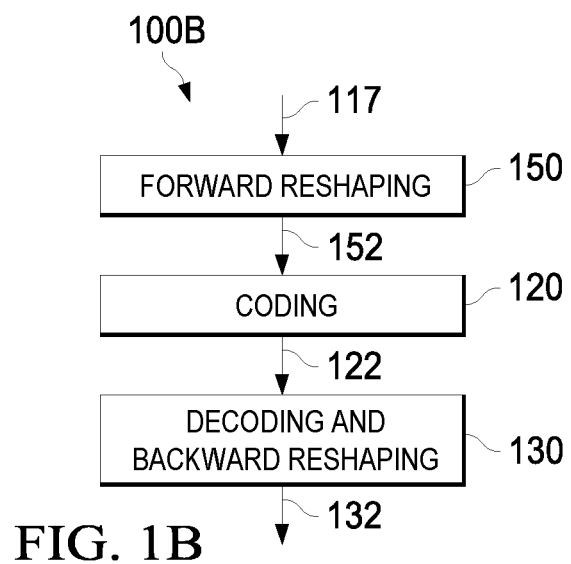
FIG. 1B is an exemplary process for content-adaptive reshaping according to various aspects of the present disclosure.

FIG. 1B depicts an example process 100B for content-adaptive reshaping according to an aspect of the present disclosure. As compared to FIG. 1A, items given the same reference numeral may refer to the same element. Given input frames 117, a forward reshaping block 150 analyzes the input and the coding constraints and generates codeword mapping functions which map input frames 117 to re-quantized output frames 152. For example, input 117 may be gamma-coded or PQ-coded according to certain EOTF. In some aspects of the present disclosure, information about the reshaping process may be communicated to downstream devices (such as decoders) using metadata. Following coding 120, the frames within decoding 130 may be processed by a backward reshaping function, which converts the frames 122 back to an EOTF domain (e.g., gamma or PQ), for further downstream processing, such as the display management process 135 discussed earlier.

As mentioned above, the backwards reshaping function is ideally configured such that the produced backward reshaped images are identical to or approximating target (for example, HDR) images that may be optimized for rendering on display devices. In other words, the quality of the produced images on the display device is dependent on the accuracy of the backwards reshaping function.

Backward Reshaping Optimization—Minimum Mean Squared Error Predictor

In following sections, optimization of the backward reshaping function is described. In the system of FIG. 1A, cumulative density function (CDF) matching is utilized to construct a luma signal channel predictor. As described in U.S. Pat. No. 10,264,287 which is incorporated herein by reference in its entirety, a SDR CDF is constructed based on an SDR histogram generated from a distribution of SDR codewords in one or more SDR images. Similarly, an HDR CDF is constructed based on an HDR histogram generated from a distribution of HDR codewords in one or more HDR images that correspond to the one or more SDR images. A histogram transfer function is then generated based on the SDR CDF and the HDR CDF. Backward reshaping metadata may then be determined using the histogram transfer function in order to determine the backward reshaping function.

Errors in the CDF may arise when chroma channel information interferes with the luma channel. Accordingly, a minimizing mean squared error (MMSE) predictor may be used to minimize the prediction error (in terms of mean squared error or MSE) for each luminance range.

Although the MMSE predictor is one solution in terms of MSE, the predictor is no guarantee of monotonically non-decreasing property. To avoid any artifacts created by non-monotonically non-decreasing properties, monotonically non-decreasing is enforced via a CDF matching for the MMSE predictor. A final curve smoothing is also applied to ensure the curve is smooth.

First, defining the source signal as $s_{ij}$ and the reference signal as $r_{ij}$ (where i is the pixel location at frame index j) and the bit depth of the source signal and the reference signal as $B_s$ and $B_r$ respectively, for each source signal bin b, an average value of reference signals mapped from the same source signal bin is found by finding the set of source signal with the value in bin b (denoted $\Phi_{b,j}$). Without limitation, as an example, the number of bins may be set as the total codewords in the signal (for example $2^{B_s}$); however, in other embodiments, to reduce computational complexity, a smaller number of bins may be selected. Given $$\Phi_{b,j} = \{i | s_{ij} == b\}, \qquad (1)$$

the average value expressed as:

$$t_{b,j} = \frac{1}{|\phi_{b,j}|} \sum_{i \in \phi_{b,j}} r_{ij} \qquad (2)$$

The mapping $t_{b,j} = f_j^{MMSE}(b)$ is the MMSE predictor. An example (200A) of the resulting MMSE prediction is shown in FIG. 2A.

Backward Reshaping Optimization—Monotonically Non-Decreasing

If the MMSE predictor is used alone, the mapping is not monotonically non-decreasing. As illustrated in FIG. 2A, some bins with larger bin indices have smaller mapped value than that from smaller bin indices. In other words, in a not monotonically non-decreasing curve, one may observe that for two bins:

$$t_{b_1,j} < t_{b_2,j} \text{ for } b_1 > b_2 \qquad (3)$$

To avoid artifacts (which the above property creates) a monotonically, non-decreasing (MND) curve should have the following property for all bins:

$$t_{b_1,j} \geq t_{b_2,j} \text{ for } b_1 > b_2 \qquad (4)$$

As described in U.S. Pat. No. 10,264,278, CDF matching generates a backward reshaping function (or BLUT) by utilizing a cumulative density function (CDF) based on an SDR histogram and a CDF based on an HDR histogram. In an embodiment, for constructing the CDFs, one may still use the SDR histogram of the source signal; however, one may construct the HDR CDF by using the MMSE prediction function of equation (2). For example, given the SDR histogram, each element of the SDR histogram is mapped to an HDR histogram using the MMSE predictor function to determine the histogram transfer function. Given the two histograms, the construction of the CDFs and the remaining of the CDF-matching algorithm remains similar to the U.S. Pat. No. 10,264,278. The output BLUT from this CDF-matching algorithm will also satisfy the MND property of equation (4).

Figure 2B:
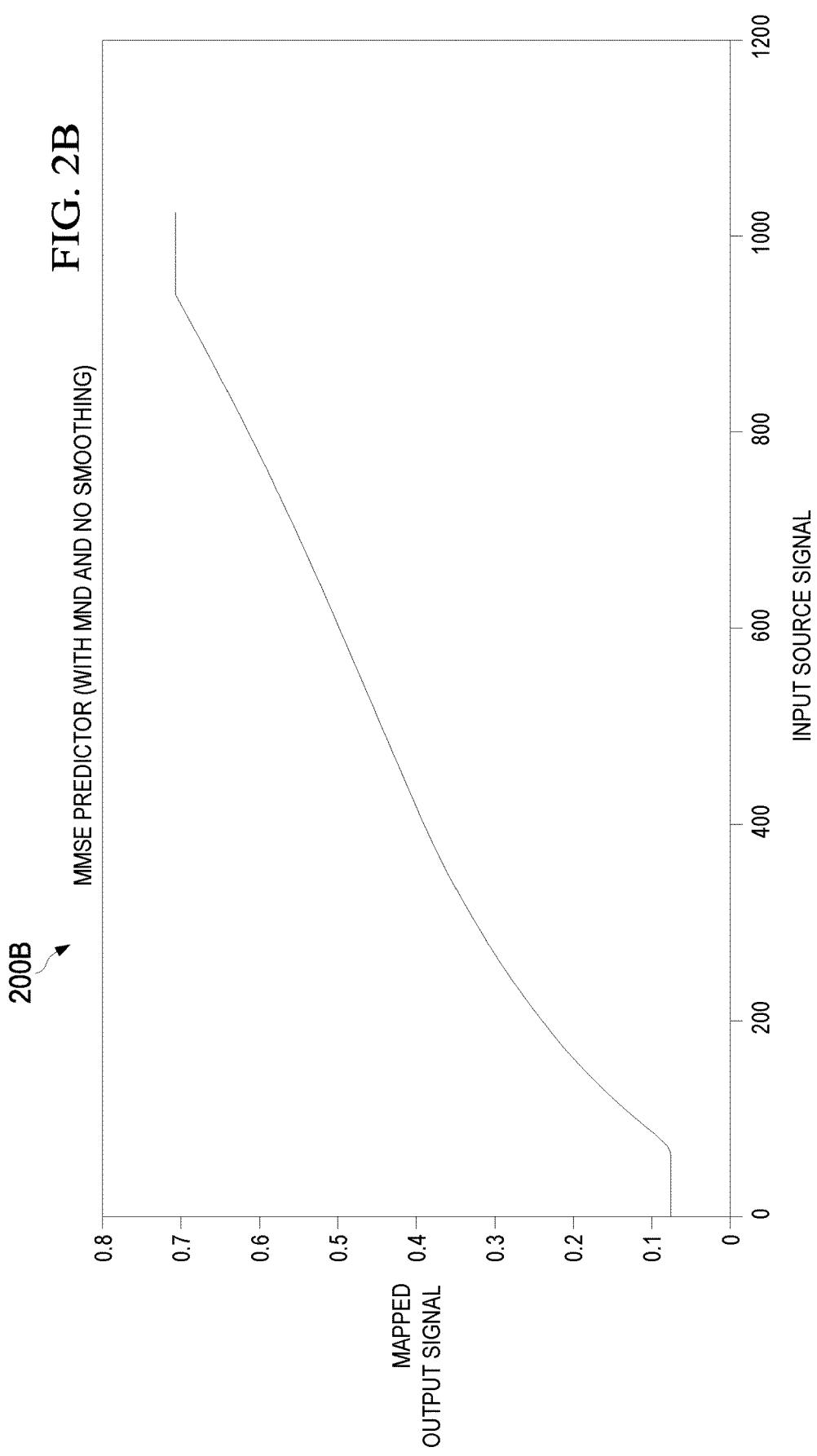
FIG. 2B is a plot illustrating the output of an example prediction algorithm according to various aspects of the present disclosure.

Using the final mapping table $\tilde{T}(b)$, after applying the MND (to the curve shown in FIG. 2A), the resulting curve is shown in the graph 200B of FIG. 2B.

Backward Reshaping Optimization—Curve Smoothing

CDF matching may ensure MND; however, the mapping function needs to be smooth enough so that it can be approximated by an 8-piece $2^{nd}$ order polynomial. Thus a smoothing filter is applied to this curve, as follows.

First, the upper bound and lower bound of the moving average for the codeword b ($b^u$ and $b^l$ respectively) are set, wherein n is half of the overall filter tap.

$$b^u = \min(b+n, b_{max}+1) \qquad (5)$$

$$b^l = \max(b-n, b_{min}-1) \qquad (6)$$

The first moving average is then applied.

$$T'(s^Y) = \frac{1}{b^u - b^l} \sum_{l=b^l}^{b^u} \tilde{T}(l), \qquad (7)$$

The second moving average is then applied.

$$T(s^Y) = \frac{1}{b^u - b^l} \sum_{l=b^l}^{b^u} T'(l) \qquad (8)$$

Note that the value of n may be 4 for a 10 bit signal. As shown in FIG. 2C, the resulting curve shown in graph 200C is smoother than the prior curve of FIG. 2B, making it easier to model it using an 8-piece, $2^{nd}$ order polynomial.

The MMSE predictor may be applied to either forward reshaping or backward reshaping paths. The MMSE predictor may also be applied to a variety of EOTFs, not just HLG to PQ.

Backward Reshaping Optimization—BLUT-Similarity Weighted Smoothing

The luma backward reshaping function for each video frame needs to be smoothed in time-domain in order prevent sudden, unintended, intensity changes/visual flashing in successive video frames within a scene. A scene-cut aware backward look up table (BLUT) smoothing can be used to mitigate the flashing. However, visual flashing issues may still occur at the automatically detected scene-cut instances due to imperfections of the automatic scene-cut detector. Thus, there is need for a smoothing mechanism not affected by false scene cut detection. Because the difference in neighboring BLUTs is already indicative of different content, the process described herein averages the BLUTs with similar shape and excludes BLUTs with dissimilar trends. In other words, a BLUT-similarity-weighted-average is utilized to solve this temporal stability issue.

Defining $T_j$ to be the non-smoothed BLUT for a frame at j, the normalized HDR codeword value $T_j^b$ at b-th SDR luma codeword for frame j. $N^S$ is the total number of SDR codewords. Considering a symmetric window of M frames on each side (for a total of 2M+1 frames) of the center frame j ([j−M, j+M]) for smoothing $T_j$, let $\check{T}_j$ be the smoothed output BLUT for the frame at j.

BLUT similarity is measured in terms of normalized squared-difference at each SDR codeword b for each j-th frame where the integer m∈ [j−M, j+M]. Defining the BLUT similarity at b-th codeword for the BLUT of m-th frame, with respect to the center frame at j as $\beta_{j,m}^b$, the resulting definition is:

$$\beta_{j,m}^b = (T_j^b - T_m^b)^2 \qquad (9)$$

noting that $\beta_{j,j}^b = 0$.

A content dependent weighing factor $\alpha_j^b$ is used as a multiplier to BLUT similarity and is determined for each b-th codeword by the SDR image histogram of j-th frame $h_j^b$ as follows:

$$\alpha_j^b = \frac{\log(h_j^b + 1)}{(\sum_{k=0}^{N^S-1} \log(h_j^k + 1))} \qquad (10)$$

In the above example, the logarithm of histogram is taken to make the range of histogram values smaller than that of the actual number of pixels at each codeword. Adding 1 while taking the logarithm ensures that the weighing factor stays finite for any histogram.

To smooth the BLUT of j-th frame, weight for each m-th frame BLUT is used, where m is from its temporal neighborhood [j−M, j+M]. The weight may be computed, for example, as an exponential or Gaussian term based on both histogram and BLUT difference. The weight for the m-th frame BLUT, $w_{j,m}$ for smoothing the j-th frame BLUT is computed as:

$$w_{j,m} = \exp\left(-\gamma \frac{1}{N^S} \sum_{b=0}^{N^S-1} \alpha_j^b \beta_{j,m}^b\right) \qquad (11)$$

where γ is a constant determined empirically such that the smoothing acts appropriately (for example, 130). Thus, the weight is specific to a frame and same for all codewords in that frame. Using the weight $w_{j,m}$ as a multiplier to each $T_m^b$ such that m∈ [j−M, j+M], the smooth BLUT for the center frame j, ($\check{T}_j$) is computed as $$\check{T}_j^b = \frac{\sum_{m=-M}^{M} w_{j,m} T_m^b}{\sum_{m=-M}^{M} w_{j,m}} \qquad (12)$$

In some aspects twelve frames (M=12) are used for BLUT smoothing. The resulting BLUT for j-th frame is used for the next process of curve fitting.

Multivariate-Multi-Regression (MMR) Optimization

In video processing, a multiple color channel, MMR predictor may be implemented, which allows input signals of a first dynamic range to be predicted using its corresponding enhanced dynamic range signal of a second dynamic range and a multivariate MMR operator (for example, the predictor described in U.S. Pat. No. 8,811,490 which is incorporated herein by reference in its entirety). The resulting data may be utilized in the determination of the backwards reshaping function. Below describes the process of selecting prediction parameters (MMR coefficients) for the MMR predictor. After color mapping pairs are collected from each pixel or as a 3D mapping table, MMR coefficients are solved by least-squares. The mapping from source image to reference image is denoted as follows:

$$\begin{bmatrix} s_0^Y & s_0^{C_0} & s_0^{C_1} \\ s_1^Y & s_1^{C_0} & s_1^{C_1} \\ \vdots & & \\ s_{K-1}^Y & s_{K-1}^{C_0} & s_{K-1}^{C_1} \end{bmatrix} \rightarrow \begin{bmatrix} r_0^Y & r_0^{C_0} & r_0^{C_1} \\ r_1^Y & r_1^{C_0} & r_1^{C_1} \\ \vdots & & \\ r_{K-1}^Y & r_{K-1}^{C_0} & r_{K-1}^{C_1} \end{bmatrix} \qquad (13)$$

where $s_k^Y$, $s_k^{C_0}$, and $s_k^{C_1}$ denote the source values of planes Y, $C_0$, and $C_1$ respectively, of the $k^{th}$ entry in the mapping table. $r_k^Y$, $r_k^{C_0}$, and $r_k^{C_1}$ denote the reference mapped values of planes Y, $C_0$, and $C_1$ respectively of the $k^{th}$ entry in the mapping table. Note K is the total entries in the mapping table.

Two vectors are constructed using the average reference chroma values.

$$v^{C_0} = \begin{bmatrix} r_0^{C_0} \\ r_1^{C_0} \\ \vdots \\ r_{K-1}^{C_0} \end{bmatrix} \quad (14)$$

$$v^{C_1} = \begin{bmatrix} r_0^{C_1} \\ r_1^{C_1} \\ \vdots \\ r_{K-1}^{C_1} \end{bmatrix} \quad (15)$$

A matrix is constructed using the source values.

$$S = \begin{bmatrix} p_0^T \\ p_1^T \\ \vdots \\ p_{K-1}^T \end{bmatrix} \quad (16)$$

Where $p_k^T = [1 \; s_{s0}^Y \; s_{s0}^{C_0} \; s_{s0}^{C_1} \; s_{s0}^Y \cdot s_{s0}^{C_0} \; s_{s0}^Y \cdot s_{s0}^{C_1} \; s_{s0}^Y \cdot s_{s0}^{C_0} \cdot s_{s0}^{C_1} \ldots]$ which contains all the terms supported by the MMR predictor.

The MMR is computed by solving the optimization problem below:

$$\min_{x^{C_0}} \|Sx^{C_0} - v^{C_0}\|^2 \quad (17)$$

$$\min_{x^{C_1}} \|Sx^{C_1} - v^{C_1}\|^2 \quad (18)$$

where $x^{C_0}$ and $x^{C_0}$ are the MMR coefficients for $C_0$ and $C_1$, respectively. Denoting:

$$A = S^T S \quad (19)$$

$$b^{C_0} = S^T v^{C_0} \quad (20)$$

$$b^{C_1} = S^T v^{C_1} \quad (21)$$

the MMR coefficients can be computed by solving the linear problems:

$$A \cdot x^{C_0} = b^{C_0} \quad (22)$$

$$A \cdot x^{C_1} = b^{C_1} \quad (23)$$

When the A matrix is close to singular (the linear problems above are ill-conditioned), issues may arise. To obtain stable solutions for ill-conditioned problems, the following may be applied.

Multivariate-Multi-Regression Optimization—Gaussian Elimination

The MMR coefficients can be solved by:

$$x^{C_0} = A^{-1} b^{C_0} \quad (24)$$

$$x^{C_1} = A^{-1} b^{C_1} \quad (25)$$

However, it may be time consuming to compute the inverse matrix of A. One solution is to apply Gaussian elimination.

During Gaussian elimination, the A matrix is converted to its upper triangular form. Back substitution is then applied to solve MMR coefficients. When some row(s) of the A matrix are close to linear combinations of some other rows, the A matrix is close to singular. This means that the corresponding MMR term(s) are close to linearly correlated with some other MMR terms. Removing these terms will make the problem better conditioned, yielding a more stable solution.

Matrix A, vectors $b^{C_0}$ and $b^{C_1}$ are denoted as shown below, where P is the total number of MMR terms.

$$A = \begin{bmatrix} a_{1,1} & a_{1,2} & \ldots & a_{1,P} \\ a_{2,1} & a_{2,2} & \ldots & a_{2,P} \\ \vdots & \vdots & \vdots & \vdots \\ a_{P,1} & a_{P,2} & \ldots & a_{P,P} \end{bmatrix} \quad (25.1)$$

$$b^{C_0} = \begin{bmatrix} b_1^{C_0} \\ b_2^{C_0} \\ \vdots \\ b_P^{C_0} \end{bmatrix} \quad (25.2)$$

$$b^{C_1} = \begin{bmatrix} b_1^{C_1} \\ b_2^{C_1} \\ \vdots \\ b_P^{C_1} \end{bmatrix} \quad (25.3)$$

For ease of description, the following process is described in terms of $C_0$. It should be noted that $C_1$ may be processed similarly. The following elimination is described with reference to the following matrix:

$$[A | b^{C_0}] = \begin{bmatrix} a_{1,1} & a_{1,2} & \ldots & a_{1,P} & | & b_1^{C_0} \\ a_{2,1} & a_{2,2} & \ldots & a_{2,P} & | & b_2^{C_0} \\ \vdots & \vdots & \vdots & & | & \vdots \\ a_{P,1} & a_{P,2} & \ldots & a_{P,P} & | & b_P^{C_0} \end{bmatrix} \quad (25.4)$$

As described in more detail in Table 1, if $|a_{m,m}| \leq \varepsilon$, where $\varepsilon$ is a small threshold, then row m and column m will be ignored, which is equivalent to removing the m-th MMR term (e.g., set $x_m^{C_0} = 0$) and the m-th equation from the system of equations, otherwise the solver proceeds to eliminate the rest of that row. In some aspects, the predetermined threshold $\varepsilon$ is approximately 1e−6. Back substitution is then applied to solve for $x^{C_0}$ of equation (22) above in order to compute the MMR coefficient utilizing the predetermined threshold $\varepsilon$. Thus, the linear problems $A \cdot x^{C_0} = b^{C_0}$ and $A \cdot x^{C_1} = b^{C_1}$ are solved using the significant MMR terms while the coefficients of insignificant terms will be zero. Linear correlation of the MMR terms is removed during the above described Gaussian elimination process, making the solution relatively stable. An example process, in pseudo-code, is depicted in Table 1.

TABLE 1

Example Pseudocode for a Stable Gaussian Solver

```
// STEP 1: convert the matrix above to its upper triangle form:
for (row m = 1 to P - 1):
{
    // STEP 1.1: find the maximum absolute value in {a_{m,m}, a_{m+1,m}, ... ,
    a_{P,m}}.
    n^{max} = m;
    for (row n = m + 1 to P):
    {
        if ( |a_{n,m}| > |a_{n^{max},m}| ):
            n^{max} = n;
    }
    // STEP 1.2: swap entire row m and row n^{max}
    for ( column n = 1 to P + 1 ):
    {
        tmp = a_{m,n};
        a_{m,n} = a_{n^{max},n};
        a_{n^{max},n} = tmp;
    }
    // STEP 1.3: eliminate entries {a_{m+1,m}, a_{m+2,m}, ... , a_{P,m}} if a_{m,m} is
    significant;
            Otherwise ignore row m and column m
            (equivalent to, removing MMR term m and the m^{th} equation);
            Threshold ε is used to determine if a_{m,m} is significant.
    if ( |a_{m,m}| > ε )
    {
        for ( row n = m + 1 to P ):
        {
            for ( column k = m to P + 1 ):
```

$$a_{n,k} = a_{n,k} - a_{m,k} \cdot \frac{a_{n,m}}{a_{m,m}};$$

```
        }
    }
}
// STEP 2: back-substitution to solve x^{C0} :
// STEP 2.1: row P:
if ( |a_{P,P}| > ε )
```

$$x_P^{C0} = \frac{a_{P,P+1}}{a_{P,P}};  \quad \text{// this MMR term is significant}$$

```
else
    x_P^{C0} = 0;        // this MMR term is removed
// STEP 2.2: row P - 1 to 1:
for ( row m = P - 1 to 1 ):
{
    if ( |a_{m,m}| > ε )   // this MMR term is significant
    {
        tmp = x_m^{C0};
        for ( column n = m + 1 to P ):
        {
            tmp = tmp - a_{m,n} · x_n^{C0};
        }
```

$$x_m^{C0} = \frac{tmp}{a_{m,m}};$$

```
    }
    else
        x_m^{C0} = 0;     // this MMR term is removed
}
```

EOTF Conversion—Full Data Points Optimization

Figure 3A:
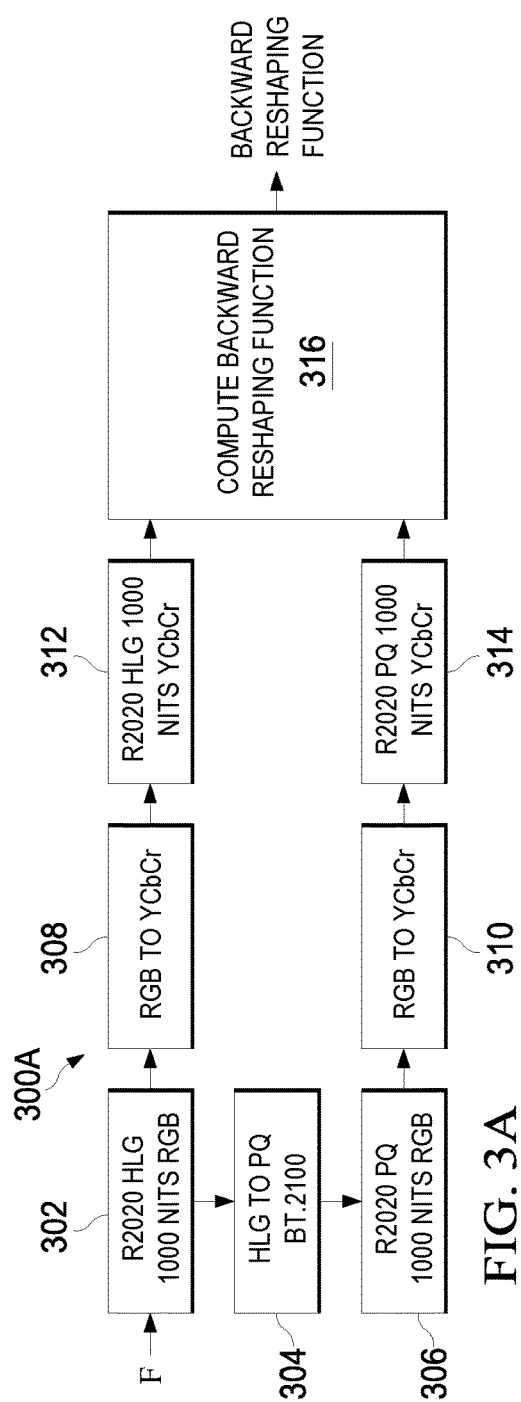
FIG. 3A is a process flow diagram of determining an exemplary backward reshaping function for a process based on a prediction function generated according to various aspects of the present disclosure.
Figure 4:
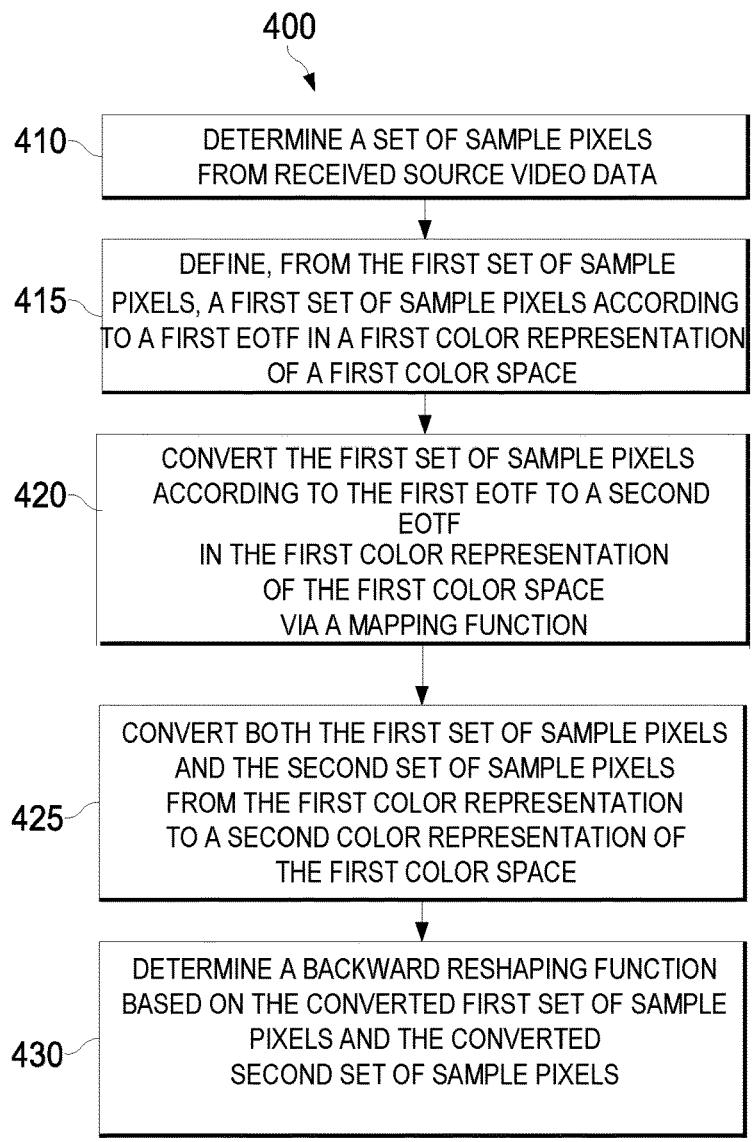
FIG. 4 is a flowchart illustrating an exemplary method of determining a backward reshaping function according to various aspects of the present disclosure.

FIG. 3A is a process diagram 300A illustrating an EOTF conversion process implemented by a controller 600, which will be described in more detail below with reference to FIG. 6. The diagram 300A is described below in conjunction with FIG. 4 which is a flowchart illustrating a method 400 for determining a backward reshaping function for video conversion (in particular, conversion from a first EOTF to another EOTF).The following passages shall describe an example EOTF conversion from a Hybrid Log-Gamma (HLG) signal to a Perceptual Quantizer (PQ) signal (in particular, a HLG Rec. 2020, at 1,000 nits, to a PQ Rec. 2020, at 1,000 nits). It should be understood, however, that the system is not necessarily limited to conversion between these particular types of signals.

First, at block 410, the controller 600 determines a first set of sample points from synthesized data (e.g. received video data) from a color grid. In particular, a set of sample points (pixels) is collected from synthesized data (for example, video 117 of FIG. 1A), denoted as Φ in FIG. 3A. In this document, the term "sample points" and "sample pixels" are used interchangeably to indicate the same thing. The set of sample points Φ is defined by first constructing a 1D sampling array $q_i$ with M samples and the $i^{th}$ point (i ∈ [0,M−1]) in normalized domain, as shown below, wherein i indicates the pixel location.

$$q_i = \frac{i}{M-1} \quad (26)$$

The 1D array $q_i$ is then used to build 3D sample points in 3D space, denoted as 3D array $q_{ijk}$ below, wherein j and k are the frame index and depth of the pixel respectively.

$$q_{ijk} = (q_i, q_j, q_k) \quad (27)$$

Accordingly, the set of sample points Φ is the collected sample points in 3D space $\{q_{ijk}\}$.

Returning to FIG. 4, at block 415, the controller 600 defines, from the set of sample points, a first set of sample points according to a first electro-optical transfer function in a first color representation of a first color space. For example, at block 302 (FIG. 3A), the set of sample points Φ is treated as (or defined) according to electro-optical transfer function HLG 1000 nits in a Rec. 2020 color space (RGB), denoted as $\Phi^{HLG,RGB,R2020}$ Note that the values in Φ are not changed here. At block 420 of FIG. 4, the processor 600 converts the first set of sample points according to the first electro-optical transfer function to a second electro-optical transfer function in the first color representation of the first color space via a mapping function, producing a second set of sample points according to the second electro-optical transfer function. For example, as shown in block 304 of FIG. 3A, the set of sample points $\Phi^{HLG,RGB,R2020}$ is converted to Rec. 2020 PQ 1000 nits RGB points via ITU-R BT.2100, the result being denoted as $\Phi^{PQ,RGB,R2020}$ (block 306).

In some aspects, at block 425, the controller 600 converts the first set of sample pixels (points) according to the first electro-optical transfer function and the second set of sample pixels (points) according to the second electro-optical transfer function to a second color representation of the first color space. For instance, in the present example, to obtain the backward reshaping function, the sample points are converted from RGB color representation to YCbCr color representation in the same color space Rec. 2020. Here, both the set of processed sample pixels (points) $\Phi^{HLG,RGB,R2020}$ and $\Phi^{PQ,RGB,R2020}$ are converted from the first color representation RGB to the second color representation YCbCr of the same color space Rec. 2020 (blocks 308 and 310 respectively of FIG. 3A). For the set of sample pixels (points) $\Phi^{HLG,RGB,R2020}$ the Rec. 2020 HLG YCbCr pixels (points) are defined as $$q_{ijk}^{HLG} = (q_i^{HLG,Y}, q_j^{HLG,C0}, q_k^{HLG,C1}) \quad (28)$$

and entire set of sample pixels (points) is defined as $\Phi^{HLG,YCbCr,R2020}$ (block 312).

For the set of processed sample points $\Phi^{PQ,RGB,R2020}$, the Rec. 2020 PQ YCbCr points are defined as $$q_{ijk}^{PQ} = (q_i^{PQ,Y}, q_j^{PQ,C0}, q_k^{PQ,C1}) \quad (29)$$

and entire set of sample points is defined as $\Phi^{PQ,YCbCr,R2020}$ (block 314 of FIG. 3A).

The backward reshaping function formula is defined as follows:

$$(\hat{q}^{PQ,Y}, \hat{q}^{PQ,C0}, \hat{q}^{PQ,C1}) = BR^{(HLG\to PQ)}(q_i^{HLG,Y}, q_j^{HLG,C0}, q_k^{HLG,C1}) \quad (30)$$

where $\hat{q}_{ijk}^{PQ} = (\hat{q}_i^{PQ,Y}, \hat{q}_j^{PQ,C0}, \hat{q}_k^{PQ,C1})$ is the predicted PQ value of each HLG pixel.

Returning to FIG. 4, at block 430, the controller 600 determines the backward reshaping function based on the converted first set of sample pixels (points) according to the first electro-optical transfer function and the converted second set of sample pixels (points) according to the second electro-optical transfer function. In the present example, to find the backward reshaping function formula, the following optimization problem is solved (block 316).

$$\min \sum_{i=0}^{M-1} \sum_{j=0}^{M-1} \sum_{k=0}^{M-1} \|q_{ijk}^{PQ} - \hat{q}_{ijk}^{PQ}\| \quad (31)$$

The optimization equation (31) may be solved in an iterative approach by repeatedly applying and adjusting a sample backward reshaping function so as to minimize a difference between a result from the sample backward reshaping function of equation (30) (the predicted PQ values obtained by applying the sample backward reshaping function to the pixels in the converted first set of sample pixels) and the pixels in the second set of sample points (29) according to the second electro-optical transfer function. As noted above, in accordance with some aspects of the present disclosure, the backward reshaping function may be a polynomial function. As such the method explained above enables to approximate conversion between HLG and PQ systems, e.g. at the encoder side without performing a full conversion. Using the above process, it is found that there may be some prediction error.

EOTF Conversion—Common Used Data Points Optimization

Figure 3B:
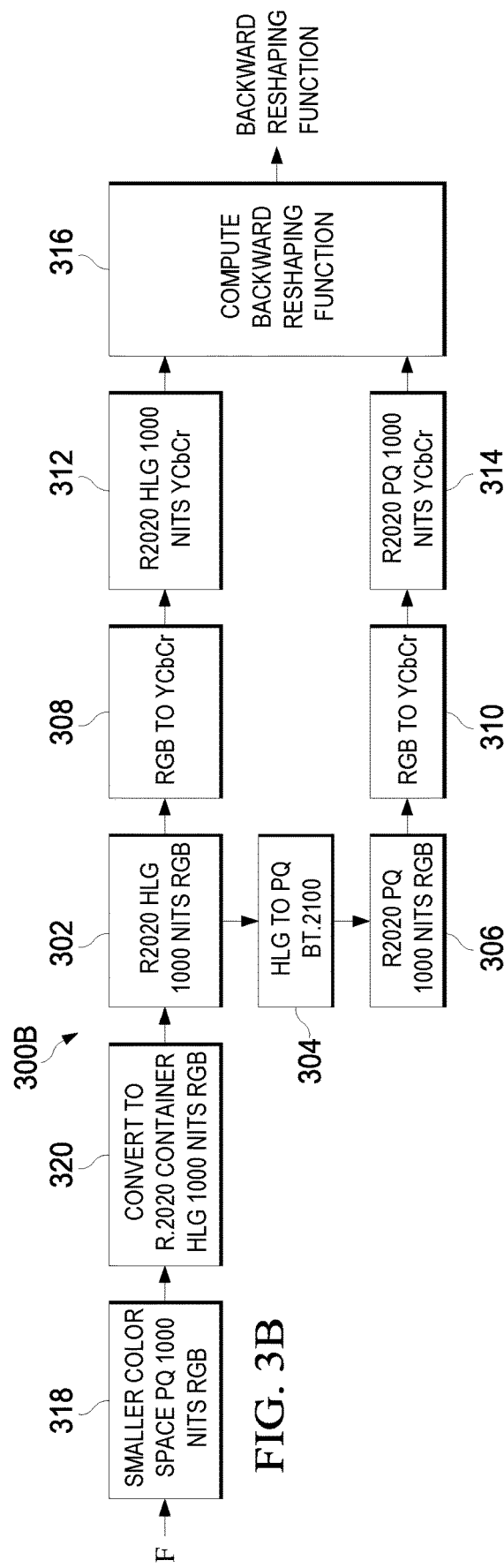
FIG. 3B is a process flow diagram of determining an exemplary backward reshaping function for the process based on a prediction function generated according to various aspects of the present disclosure.

The method and processes described below provide a solution to improve the accuracy of the backward reshaping function determination described above by utilizing a small range inside of the Rec. 2020 color space. FIG. 3B is a process diagram 300B illustrating a modified EOTF conversion process implemented by a controller 600 (FIG. 6). It should be noted that the process diagram 300B includes similar steps/blocks as those in the process diagram 300A and are accordingly labeled the same (in particular, blocks 302, 304, 306, 308, 310, 312, 314, and 316).

In the example illustrated in FIG. 3B, following determining a set of sample points from received source data, the generation of the first set of sample points according to the first electro-optical transfer function of a first color space further includes, at block 318, producing, from the set of data points, a third set of sample points according to a third electro-optical transfer function in the first color representation of a second color space (here, PQ 1000 nits Rec. 709 RGB), and producing the first set of sample points according to the first electro-optical transfer function based on the third set of sample points according to the third electro-optical transfer function, wherein the second color space is smaller than the first color space. In the example illustrated in FIG. 3B, the third electro-optical transfer function in the first color representation of the second color space is denoted as $\Phi^{PQ,RGB,R709}$. As mentioned above, the second color space is smaller than the first color space. The second color space may be determined or selected based on the visual content of the received data. For example, in the present example, the data may be of a nature scene. Accordingly, Rec. 709 is selected because, although smaller than a color space of a higher definition standard such as Rec. 2020, it includes most of the color necessary for nature scenes. By using a smaller color space including colors which are most commonly used in a particular scene non-linearities are reduced when using a predictor for approximating conversion of pixel values and prediction errors can be reduced.

At block 320, the controller 600 converts the third electro-optical transfer function in a first color representation of the second color space to a container of the first electro-optical transfer function of the first color representation of the first color space, producing the first set of sample pixels (points) according to the first electro-optical transfer function of block 302. In the present example, the container in the first color representation of the first color space defined by the first set of sample points is Rec. 2020 HLG RGB and the resulting set of sample pixels (points) is denoted as $\Phi^{HLG,RGB,R2020}$ (block 302 of FIG. 3B). The signal at block 302 is then processed similar to the corresponding blocks of the method 300A of FIG. 3A (blocks 304, 306, 308, 310, 312, 314, and 316).

In some aspects of the present disclosure, to include data in a wider color space, the controller 600 may, in defining the first set of sample points according to the first electro-optical transfer function, interpolate the third set of sample points according to the third electro-optical transfer function of the second color space and a fourth set of sample points according to a fourth electro-optical transfer function of the first color representation of a third color space (described below). The resulting first set of sample points according to the first electro-optical transfer function thus includes a weighed combination of the third set of sample points according to the third electro-optical transfer function of the second color space and the fourth set of sample points according to the fourth electro-optical transfer function of the third color space. It should be noted that the interpolating includes converting both of the third set of sample points and the fourth set of sample points to a common electro-optical transfer function of a common color space.

Figure 3C:
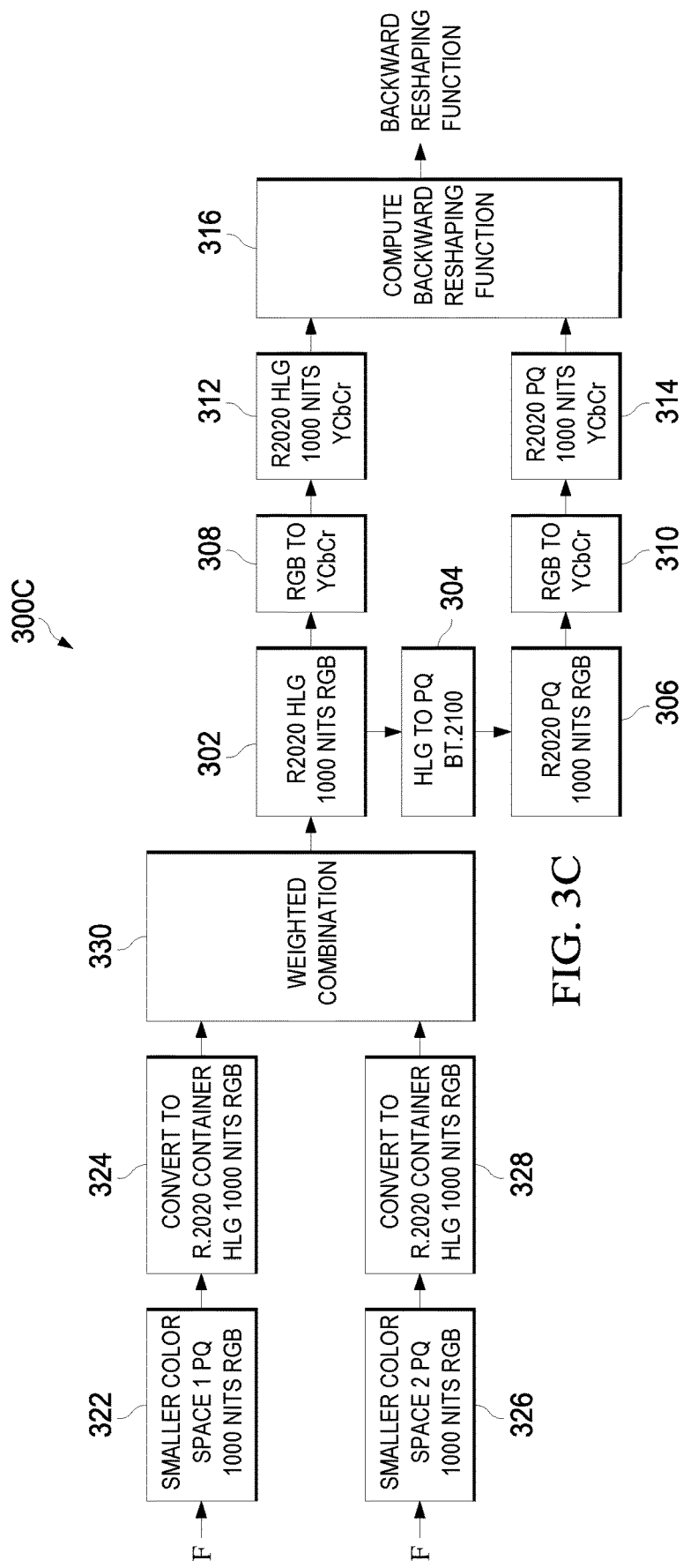
FIG. 3C is a process flow diagram of determining an exemplary backward reshaping function for the process based on a prediction function generated according to various aspects of the present disclosure.

For instance, in the present example, sample points may be interpolated from Rec.709 and Rec. 2020. FIG. 3C illustrates a modified EOTF conversion process (utilizing interpolation) implemented by a controller 600 (FIG. 6). It should be noted that the process diagram 300C includes similar steps/blocks as those in the process diagram 300A and are accordingly labeled the same (in particular, blocks 302, 304, 306, 308, 310, 312, 314, and 316). It should also be noted that the process performed at blocks 322 and 324 (and 326 and 328) are similar to the process performed at blocks 318 and 320 of method 300B of FIG. 3B.

At block 322, the controller 600 defines a set of sample points $\Phi$ as in Rec.709 PQ 1000 nits RGB color space as $\Phi_1^{PQ,RGB,R709}$ (a third set of sample points according to the third electro-optical transfer function of the second color space) similar to block 318 of FIG. 3B. Then, at block 324, the controller 600 converts the third set of sample points $\Phi$ to Rec. 2020 HLG container as $\Phi_1^{HLG,RGB,R2020}$. Then, a duplicate of the original set of sample points $\Phi$ of the video data is defined as in Rec. 2020 PQ 1000 nits RGB color space as $\Phi_2^{PQ,RGB,R2020}$ at block 326 (a fourth set of sample points according to a fourth electro-optical transfer function of a third color space). Then, at block 328, the set $\Phi_2^{PQ,RGB,R2020}$ is converted to Rec. 2020 HLG container as $\Phi_2^{HLG,RGB,R2020}$ (e.g. to a container of a first color representation (RGB) of a common color space Rec. 2020 of the third set of samples). At block 330, the controller 600 weighs and combines the data points in all the color channels as $$\Phi^{HLG,RGB,R2020} = w \cdot \Phi_1^{HLG,RGB,R2020} + (1-w) \cdot \Phi_2^{HLG,RGB,R2020} \quad (32)$$

The resulting HLG set $\Phi^{HLG,RGB,R2020}$ from the above equation (32) (block 302) is then converted to Rec. 2020 PQ 1000 nits RGB points (block 304), the resulting set denoted as $\Phi^{PQ,RGB,R2020}$ (block 306). The sets $\Phi^{HLG,RGB,R2020}$ and $\Phi^{PQ,RGB,R2020}$ are then converted at blocks 308 and 310 respectively to the second color representation YCbCr of the same color space Rec. 2020 and the resulting sets are used to compute the backward reshaping function at block 316.

Signal Legalization

To further improve the above described methods, a signal legalization function/process may be implemented. For example, as described below, a signal legalization function configured to modify an input to conform with a predetermined range may be applied to the first set of sample points $\Phi$. Signal legalization is the correcting of input signals that are out-of-range to reside in the desired legal range. The pipeline (for example, the pipeline 100A of FIG. 1A) may introduce out of range signals to the video data during processing, which may result in undesired artifacts in the final video signal. As described below, in some aspects of the present disclosure the signal legalization function implements a hard-clipping. In some aspects of the present disclosure, the signal legalization function is a piecewise linear function. In some aspects of the present disclosure, the signal legalization function is a sigmoid curve.

Signal Legalization—Input Signal Legalization

Input signal legalization may be implemented using hard clipping methods (clipping a signal that is outside the desired range). Although simple to implement, the final visual product may be insufficient. To solve this, soft clipping or graduated transition near the boundary of the legal range may be applied.

One method is to apply a piecewise linear legalization. The piecewise linear legalization maintains the linear relationship between the input and legalized signal in the middle range and imposes compression for signal near the legal/illegal boundary. First, defining the input range as $[x_L, x_H]$, the pivot points as $[x_{p1}, x_{p2}]$, and the legalization function as $f_L^{pwl}(\,)$, the corresponding legalized values are:

$$f_L^{pwl}(x_L) = 0 \quad (33)$$

$$f_L^{pwl}(x_H) = 1 \quad (34)$$

$$f_L^{pwl}(x_{p1}) = x_{p1} \quad (35)$$

$$f_L^{pwl}(x_{p2}) = x_{p2} \quad (36)$$

The piecewise equation may be represented as $$f_L^{pwl}(x) = \begin{cases} (x - x_L)\frac{x_{p1}}{x_{p1} - x_L}, & \text{for } x \le x_{p1} \\ x, & \text{for } x_{p1} < x \le x_{p2} \\ (x - x_{p2})\frac{1 - x_{p2}}{x_H - x_{p2}} + x_{p2}, & \text{for } x > x_{p2} \end{cases} \quad (37)$$

FIG. 5A is a plot 500A of the piecewise equation above where the input range is $[x_L, x_H] = [-0.2, 1.2]$, and the pivot points is $[x_{p1}, x_{p2}] = [0.2\ 0.8]$. As can be seen from the plot 500A, there is first order discontinuity at the pivot points 502A and 502B, which may cause global model issues. This may be solved by approximating the piecewise linear by the sigmoid curve, which may be characterized by the following equation:

$$f_L^{sgm}(x) = a_1 + \frac{a_2 - a_1}{1 + 10^{a_4(a_3 - x)}} \quad (38)$$

Figure 5B:
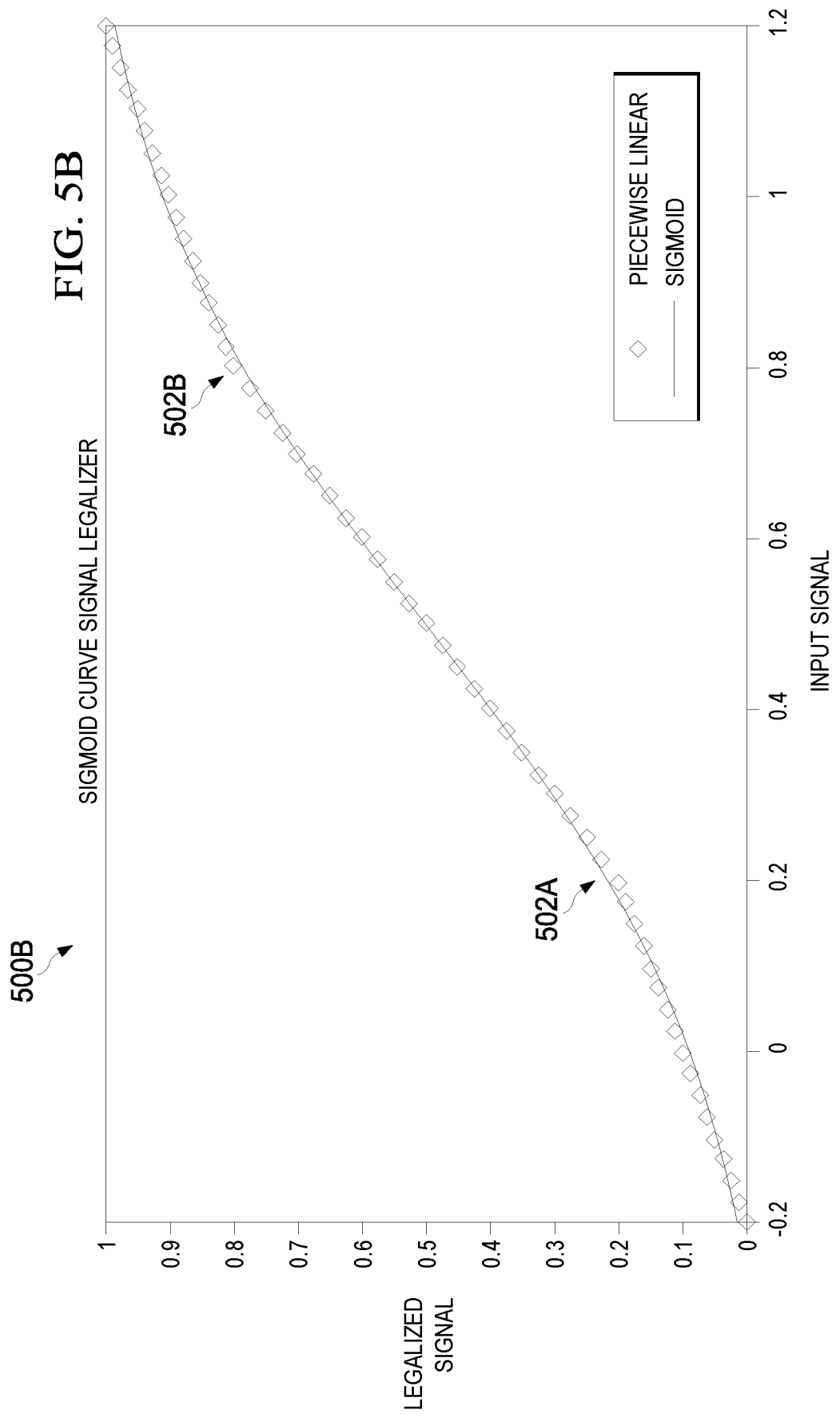
FIG. 5B is a plot of an exemplary approximated sigmoid curve for signal legalization according to various aspects of the present disclosure.

The variables $a_1$, $a_2$, $a_3$, and $a_4$ above represent four parameter models. Using a given piecewise model, $f_L^{pwl}(x)$, the parameters may be computed via nonlinear optimization. FIG. 5B shows a plot 500B of the approximated sigmoid curve (parameters below) by given the piecewise parameters $[x_L, x_H] = [-0.2, 1.2]$, and $[x_{p1}, x_{p2}] = [0.2\ 0.8]$.

$$a_1 = -0.0645 \quad (39)$$

$$a_2 = 1.0645 \quad (40)$$

$$a_3 = 0.5000 \quad (41)$$

$$a_4 = 1.6007 \quad (42)$$

EOTF Conversion—Signal Legalization

Figure 3D:
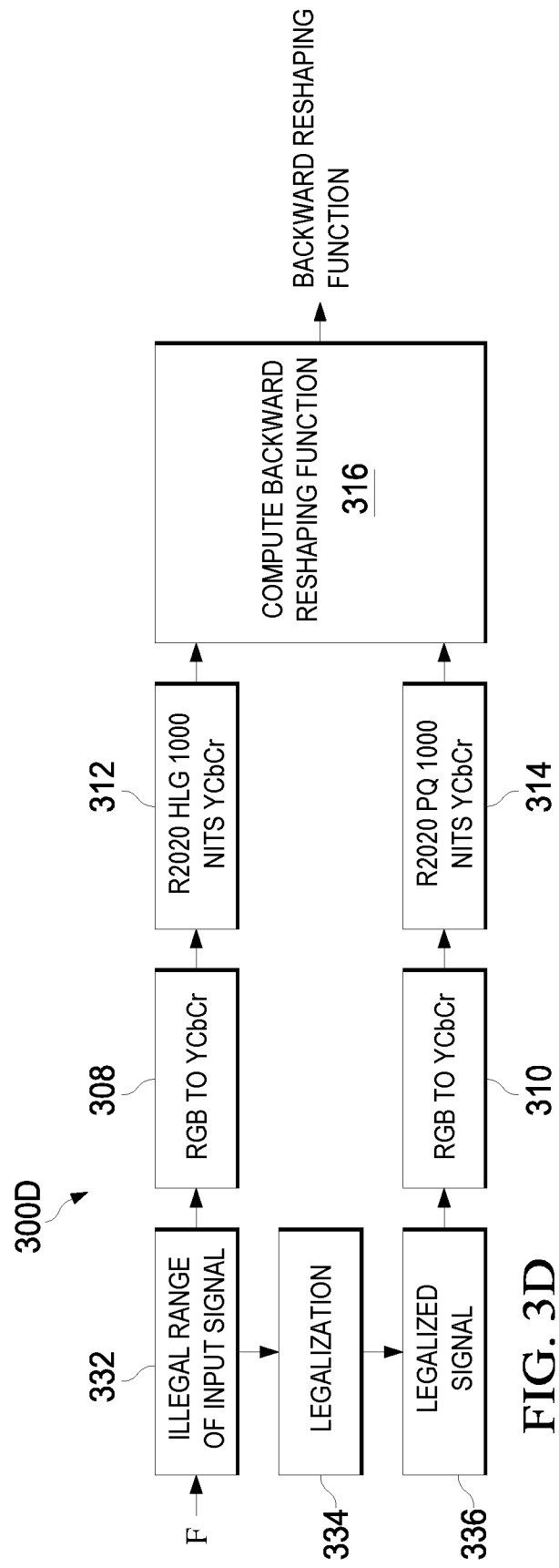
FIG. 3D is a process flow diagram of determining an exemplary backward reshaping function for the imaging process based on a prediction function generated according to various aspects of the present disclosure.

Using the above techniques, the method 300A of FIG. 3A (as well as methods 300B and 300C of FIGS. 3B and 3C respectively) may further be modified to incorporate signal legalization. FIG. 3D illustrates a modified EOTF conversion process (utilizing signal legalization) implemented by a controller 500 (FIG. 5). Similar to the EOTF conversion described above, a set of sample points $\Phi$ is collected (as described above in regard to equations (1) and (2)). This set of sample points $\Phi$ is defined as an illegal input signal (block 332). Next, the controller 600 builds a corresponding legalized set by applying the legalization function (either of $f_L^{pwl}(x)$ or $f_L^{sgm}(x)$ of the equations (12) and (13) respectively above) to each sample point $q_i$ (block 334), creating the legalized value $q_i^L$ (block 336).

$$q_i^L = f_L(q_i) \quad (43)$$

The above 1D array is used to build 3D sample points in 3D space using the below formula.

$$q_{ijk}^L = (q_i^L, q_j^L, q_k^L) \quad (44)$$

The collected legalized points $\{q^L_{ijk}\}$ are denoted as set $\Phi^L$.

To obtain the backward reshaping function, the sample points of the set $\Phi$ are defined, at block 308, in Rec. 2020 HLG YCbCr points as $$q_{ijk}^{in}(q_i^{in,Y}, q_j^{in,C0}, q_k^{in,C1}) \quad (45)$$

and the converted set is denoted as $\Phi^{in,YCbCr,R2020}$.

At block 310, the sample points of the legalized set $\Phi^L$ are defined, at block 310, in Rec. 2020 PQ YCbCr and are denoted as $$q_{ijk}^{lg} = (q_i^{lg,Y}, q_j^{lg,C0}, q_k^{lg,C1}) \quad (46)$$

and the converted legalized set is denoted as $\Phi^{lg,YCbCr,R2020}$.

The backward reshaping function is then computed (block 316) from input illegal signal $\Phi^{in,YCbCr,R2020}$ to legal signal $\Phi^{lg,YCbCr,R2020}$ Similar to block 316 described above in regard to FIG. 3A, the backward reshaping function formula is defined as follows:

$$(\hat{q}_i^{lg,Y}, \hat{q}_j^{lg,C0}, \hat{q}_k^{lg,C1}) = BR^{(in \to lg)}(q_i^{in,Y}, q_j^{in,C0}, q_k^{in,C1}) \quad (47)$$

where $\hat{q}_{ijk}^{lg} = (\hat{q}_i^{lg,Y}, \hat{q}_j^{lg,C0}, \hat{q}_k^{lg,C1})$ is the predicted value.

To find the backward reshaping function formula, the following optimization problem is solved (block 316).

$$\min \sum_{i=0}^{M-1} \sum_{j=0}^{M-1} \sum_{k=0}^{M-1} \|q_{ijk}^{lg} - \hat{q}_{ijk}^{lg}\| \qquad (48)$$

Example Hardware Device

Figure 6:
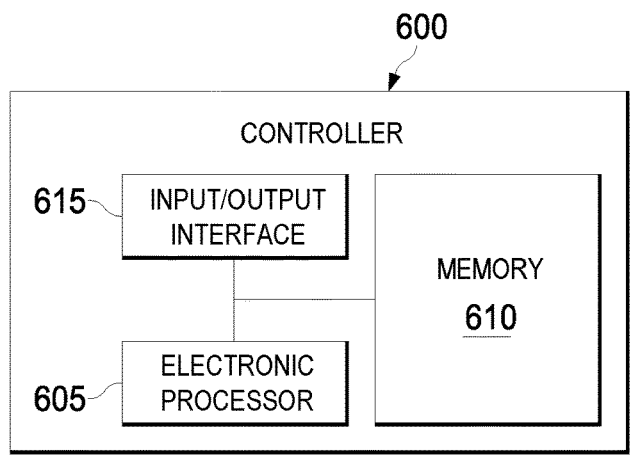
FIG. 6 is block diagram of an exemplary processing device capable of implementing the process of FIG. 4 according to various aspects of the present disclosure.

FIG. 6 is a block diagram of a controller 600 in accordance with some aspects of the present disclosure. The controller 600 may be the device described above for generating a backward reshaping function for rendering video on a target display. The controller 600 includes an electronic processor 605, a memory 610, and an input/output interface 615. The electronic processor 605 may be configured, e.g., to perform the method described with reference to FIG. 4. The electronic processor 605 obtains and provides information (for example, from the memory 610 and/or the input/output interface 615), and processes the information by executing one or more software instructions or modules, capable of being stored, for example, in a random access memory ("RAM") area of the memory 610 or a read only memory ("ROM") of the memory 610 or another non-transitory computer readable medium (not shown). The software can include firmware, one or more applications, program data, filters, rules, one or more program modules, and other executable instructions. The electronic processor 605 may include multiple cores or individual processing units. The electronic processor 605 is configured to retrieve from the memory 610 and execute, among other things, software related to the control processes and methods described herein.

The memory 610 can include one or more non-transitory computer-readable media, and includes a program storage area and a data storage area. The program storage area and the data storage area can include combinations of different types of memory, as described herein. The memory 610 may take the form of any non-transitory computer-readable medium.

The input/output interface 615 is configured to receive input and to provide system output. The input/output interface 615 obtains information and signals from, and provides information and signals to (for example, over one or more wired and/or wireless connections) devices both internal and external to the controller 600, for example, a video data source of the post production 115 (FIG. 1A). The controller 600 may include or be configured to function as an encoder, a decoder, or both.

Equivalents, Extensions, Alternatives, and Miscellaneous

In the foregoing specification, specific aspects of the present disclosure have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain aspects, and should in no way be construed so as to limit the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a," does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and the term may be defined to be within 10%, within 5%, within 1%, or within 0.5% in aspects of the present disclosure. The term "coupled" as used herein is defined as connected, although not necessarily directly and not necessarily mechanically. A device or structure that is "configured" in a certain way is configured in at least that way, but may also be configured in ways that are not listed.

It will be appreciated that some aspects of the present disclosure may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, the present disclosure can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Various aspects of the present disclosure may take any one or more of the following exemplary configurations:

(1) A device for generating high-dynamic range video data, and comprising a memory and an electronic processor. The electronic processor is configured to determine a set of sample points from synthesized data, define, from the set of sample points a first set of sample points according to a first electro-optical transfer function of a first color space, convert the first set of sample points according to the first electro-optical transfer function to a second electro-optical transfer function via a mapping function, producing a second set of sample points according to the second electro-optical transfer function, and determine a backward reshaping function based on first set of sample points according to the first electro-optical transfer function and the second set of sample points according to the second electro-optical transfer function.

(2) The device of (1), wherein the electronic processor is configured to determine the backward reshaping function by repeatedly applying and adjusting a sample backward reshaping function so as to minimize a difference between a result of the sample backward reshaping function and the second set of sample points according to the second electro-optical transfer function.

(3) The device of (1) or (2), wherein converting the first set of sample points according to the first electro-optical transfer function to the second electro-optical transfer function via the mapping function includes applying a signal legalization function to the first set of sample points according to the first electro-optical transfer function.

(4) The device of any one of (1) to (3), wherein the first electro-optical transfer function is hybrid log gamma.

(5) The device of any one of (1) to (4), wherein the second electro-optical transfer function is perceptual quantizer.

(6) The device of any one of (1) to (5), wherein defining the first set of sample points according to the first electro-optical transfer function includes producing, from the set of data points, a third set of sample points according to a third electro-optical transfer function of a second color space, and producing the first set of sample points according to the first electro-optical transfer function based on the third set of sample points according to the third electro-optical transfer function of the second color space, wherein the second color space is smaller than the first color space.

(7) The device of (6), wherein defining the first set of sample points according to the first electro-optical transfer function includes interpolating the third set of sample points according to the third electro-optical transfer function of the second color space and a fourth set of sample points according to a fourth electro-optical transfer function of a third color space such that the first set of sample points according to the first electro-optical transfer function includes a weighed combination of the third set of sample points according to the third electro-optical transfer function of the second color space and the fourth set of sample points according to the fourth electro-optical transfer function of the third color space, wherein interpolating includes the third set of sample points and the fourth set of sample points are converted to a common electro-optical transfer function of a common color space.

(8) The device of any one of (1) to (7), wherein the electronic processor is further configured to determine the backward reshaping function based on backwards reshaping function data from a minimum mean squared error predictor.

(9) The device of (8), wherein a plurality of parameters of the minimum mean squared error predictor are determined based on a multi-channel multiple regression model.

(10) The device of any one of (1) to (9), wherein the electronic processor is further configured to determine the backward reshaping function based on a smoothed equal weight backwards look up table.

(11) The device of any one of (1) to (10), wherein the device is an encoder.

(12) A method for converting a signal corresponding to a first electro-optical transfer function to a signal corresponding to a second electro-optical transfer function, the method comprising determining a set of sample points from synthesized data, defining, from the set of sample points, a first set of sample points according to a first electro-optical transfer function of a first color space, converting the first set of sample points according to the first electro-optical transfer function to a second electro-optical transfer function via a mapping function, producing a second set of sample points according to the second electro-optical transfer function, and determining a backward reshaping function based on first set of sample points according to the first electro-optical transfer function and the second set of sample points according to the second electro-optical transfer function.

(13) The method of (12) wherein determining the backward reshaping function includes repeatedly applying and adjusting a sample backward reshaping function so as to minimize a difference between a result of the sample backward reshaping function and the second set of sample points according to the second electro-optical transfer function.

(14) The method of (12) or (13), wherein converting the first set of sample points according to the first electro-optical transfer function to the second electro-optical transfer function via the mapping function includes applying a signal legalization function to the first set of sample points according to the first electro-optical transfer function.

(15) The method of (14), wherein the signal legalization function implements a hard-clipping.

(16) The method of (14), wherein the signal legalization function is a piecewise linear function.

(17) The method of (14) wherein the signal legalization function is a sigmoid curve.

(18) The method of any one of (12) to (17), wherein the first electro-optical transfer function is hybrid log gamma.

(19) The method of any one of (12) to (18), wherein the second electro-optical transfer function is perceptual quantizer.

(20) The method of any one of (12) to (19), wherein defining the first set of sample points according to the first electro-optical transfer function includes producing, from the set of data points, a third set of sample points according to a third electro-optical transfer function of a second color space, and producing the first set of sample points according to the first electro-optical transfer function based on the third set of sample points according to the third electro-optical transfer function of the second color space, wherein the second color space is smaller than the first color space.

(21) The method of (20), wherein defining the first set of sample points according to the first electro-optical transfer function includes interpolating the third set of sample points according to the third electro-optical transfer function of the second color space and a fourth set of sample points according to a fourth electro-optical transfer function of a third color space such that the first set of sample points according to the first electro-optical transfer function includes a weighed combination of the third set of sample points according to the third electro-optical transfer function of the second color space and the fourth set of sample points according to the fourth electro-optical transfer function of the third color space, wherein interpolating includes the third set of sample points and the fourth set of sample points are converted to a common electro-optical transfer function of a common color space.

(22) The method of any one of (12) to (21) wherein the backward reshaping function is further determined based on backwards reshaping function data from a minimum mean squared error predictor.

(23) The method of (22), wherein a plurality of parameters of the minimum mean squared error predictor are determined based on a multi-channel multiple regression model.

(24) The method of (23), wherein computing a solution for the multi-channel multiple regression (MMR) model comprises using a Gaussian elimination method to reduce ill conditions in the MMR model.

(25) The method of any one of (12) to (24), wherein determining the backward reshaping function is based on a smoothed equal weight backwards look up table.

(26) A non-transitory computer-readable medium storing instructions that, when executed by a processor of a computer, cause the computer to perform the method of any of (12)-(25).

Various aspects of the present invention may be appreciated from the following enumerated example embodiments (EEEs):

1. A device for generating high-dynamic range video data, and comprising:
   a memory; and
   an electronic processor configured to
      determine a set of sample points from synthesized data;
      define, from the set of sample points, a first set of sample points according to a first electro-optical transfer function of a first color space;
      convert the first set of sample points according to the first electro-optical transfer function to a second electro-optical transfer function via a mapping function, producing a second set of sample points according to the second electro-optical transfer function; and
      determine a backward reshaping function based on the first set of sample points according to the first electro-optical transfer function and the second set of sample points according to the second electro-optical transfer function.

2. The device of EEE 1, wherein the electronic processor is configured to determine the backward reshaping function by repeatedly applying and adjusting a sample backward reshaping function so as to minimize a difference between a result of the sample backward reshaping function and the second set of sample points according to the second electro-optical transfer function.

3. The device of EEE 1 or 2, wherein converting the first set of sample points according to the first electro-optical transfer function to the second electro-optical transfer function via the mapping function includes applying a signal legalization function configured to modify an input to conform with a predetermined range to the first set of sample points according to the first electro-optical transfer function.

4. The device of any one of EEEs 1 to 3, wherein the first electro-optical transfer function is hybrid log gamma.

5. The device of any one of EEEs 1 to 4, wherein the second electro-optical transfer function is perceptual quantizer.

6. The device of any one of EEEs 1 to 5, wherein defining the first set of sample points according to the first electro-optical transfer function includes
   producing, from the set of data points, a third set of sample points according to a third electro-optical transfer function of a second color space, and
   producing the first set of sample points according to the first electro-optical transfer function based on the third set of sample points according to the third electro-optical transfer function of the second color space, wherein the second color space is smaller than the first color space.

7. The device of EEE 6, wherein defining the first set of sample points according to the first electro-optical transfer function includes interpolating the third set of sample points according to the third electro-optical transfer function of the second color space and a fourth set of sample points according to a fourth electro-optical transfer function of a third color space such that the first set of sample points according to the first electro-optical transfer function includes a weighed combination of the third set of sample points according to the third electro-optical transfer function of the second color space and the fourth set of sample points according to the fourth electro-optical transfer function of the third color space, wherein interpolating includes the third set of sample points and the fourth set of sample points are converted to a common electro-optical transfer function of a common color space.

8. The device of any one of EEEs 1 to 7, wherein the electronic processor is further configured to determine the backward reshaping function based on backwards reshaping function data from a minimum mean squared error predictor.

9. The device of any one of EEEs 1 to 8, wherein the device is an encoder.

10. A method for converting a signal corresponding to a first electro-optical transfer function to a signal corresponding to a second electro-optical transfer function, the method comprising:
    determining a set of sample points from synthesized data;
    defining, from the set of sample points, a first set of sample points according to a first electro-optical transfer function of a first color space;
    converting the first set of sample points according to the first electro-optical transfer function to a second electro-optical transfer function via a mapping function, producing a second set of sample points according to the second electro-optical transfer function; and
    determining a backward reshaping function based on the first set of sample points according to the first electro-optical transfer function and the second set of sample points according to the second electro-optical transfer function.

11. The method of EEE 10, wherein determining the backward reshaping function includes repeatedly applying and adjusting a sample backward reshaping function so as to minimize a difference between a result of the sample backward reshaping function and the second set of sample points according to the second electro-optical transfer function.
12. The method of EEE 10 or 11, wherein converting the first set of sample points according to the first electro-optical transfer function to the second electro-optical transfer function via the mapping function includes applying a signal legalization function configured to modify an input to conform with a predetermined range to the first set of sample points according to the first electro-optical transfer function.
13. The method of EEE 12, wherein the signal legalization function implements a hard-clipping.
14. The method of EEE 12 or 13, wherein the signal legalization function is a piecewise linear function.
15. The method of EEE 12 or 13, wherein the signal legalization function is a sigmoid curve.
16. The method of any one of EEEs 10 to 15, wherein the first electro-optical transfer function is hybrid log gamma.
17. The method of any one of EEEs 10 to 16, wherein the second electro-optical transfer function is perceptual quantizer.
18. The method of any one of EEEs 10 to 17, wherein defining the first set of sample points according to the first electro-optical transfer function includes
producing, from the set of data points, a third set of sample points according to a third electro-optical transfer function of a second color space, and
producing the first set of sample points according to the first electro-optical transfer function based on the third set of sample points according to the third electro-optical transfer function of the second color space, wherein the second color space is smaller than the first color space.
19. The method of EEE 18, wherein defining the first set of sample points according to the first electro-optical transfer function includes interpolating the third set of sample points according to the third electro-optical transfer function of the second color space and a fourth set of sample points according to a fourth electro-optical transfer function of a third color space such that the first set of sample points according to the first electro-optical transfer function includes a weighed combination of the third set of sample points according to the third electro-optical transfer function of the second color space and the fourth set of sample points according to the fourth electro-optical transfer function of the third color space, wherein interpolating includes the third set of sample points and the fourth set of sample points are converted to a common electro-optical transfer function of a common color space.
20. The method of any one of EEEs 10 to 19, wherein the backward reshaping function is further determined based on backwards reshaping function data from a minimum mean squared error predictor.
21. A non-transitory computer-readable medium storing instructions that, when executed by a processor of a computer, cause the computer to perform a method according to any one of EEEs 10-20.

The invention claimed is:
1. A device for determining a backward reshaping function, comprising:
an electronic processor configured to:
determine a set of sample pixels from received video data;
define, from the set of sample pixels, a first set of sample pixels according to a first electro-optical transfer function in a first color representation of a first color space;
convert the first set of sample points according to the first electro-optical transfer function to a second electro-optical transfer function in the first color representation of the first color space via a mapping function, producing, from the first set of sample pixels, a second set of sample pixels according to the second electro-optical transfer function;
convert the first set of sample pixels and the second set of sample pixels from the first color representation to a second color representation of the first color space;
determine a backward reshaping function based on the converted first set of sample pixels and the converted second set of sample pixels;
wherein the electronic processor is configured to determine the backward reshaping function by repeatedly applying and adjusting a sample backward reshaping function so as to minimize a difference between predicted pixel values obtained by applying the sample backward reshaping function to the pixels in the converted first set of sample pixels, and the pixels in the converted second set of sample pixels,
wherein the received video data comprise one or more first image in a first dynamic range and the second set of sample pixels belong to one or more second images in a second dynamic range, the first dynamic range being lower than the second dynamic range, and wherein the electronic processor is further configured to determine
a first cumulative density function based on a first histogram generated from a first distribution of codewords in the one or more first images,
a second cumulative density function based on a second histogram generated from a second distribution of codewords in the one or more second images, and
a histogram transfer function based on the first cumulative density function and the second cumulative density function for determining the backward reshaping function.
2. The device of claim 1, wherein the backward reshaping function is a luminance backward reshaping function.
3. The device according to claim 1, wherein the electronic processor is further configured to determine the predicted values by applying a predictor for minimizing the mean squared error.
4. The device according to claim 3, wherein the electronic processor is configured to map each codeword from the first distribution of codewords to the second distribution of codewords using the predictor to determine the histogram transfer function.
5. The device of claim 3, wherein a plurality of parameters of the minimum mean squared error predictor are determined based on a multi-channel multiple regression model.
6. The device of claim 5, wherein the backward reshaping function is a chroma backward reshaping function.
7. The device of claim 1, wherein the electronic processor is further configured to determine the backward reshaping function based on a smoothed equal weight backwards look up table.
8. The device of claim 1, wherein the electronic processor is configured to determine the set of sample pixels as a three dimensional pixel array of sample pixels $q_{ijk}$, wherein i indicates the pixel location of a corresponding one dimensional pixel array $q_i$ with M samples and wherein j and k are the frame index and depth of the pixel.
9. The device of claim 1, wherein converting the first set of sample pixels according to the first electro-optical transfer function to the second electro-optical transfer function via the mapping function includes applying a signal legalization function to the first set of sample pixels for forcing a range of the first set of sample pixels to be within a predetermined range.

10. The device of claim 9, wherein the signal legalization function is one of
   a clipping function comprising clipping the sample pixels of the first set outside the predetermined range,
   a piecewise linear function, or
   a sigmoid curve function.

11. The device of claim 1, wherein the first electro-optical transfer function is hybrid log gamma.

12. The device of claim 1, wherein the second electro-optical transfer function is perceptual quantizer.

13. The device of claim 1, wherein defining the first set of sample pixels according to the first electro-optical transfer function includes
   producing, from the set of data pixels, a third set of sample pixels according to a third electro-optical transfer function in the first color representation of a second color space, and
   producing the first set of sample pixels according to the first electro-optical transfer function based on the third set of sample pixels according to the third electro-optical transfer function of the second color space, wherein the second color space is smaller than the first color space.

14. The device of claim 13, wherein defining the first set of sample pixels according to the first electro-optical transfer function includes interpolating the third set of sample pixels according to the third electro-optical transfer function in the first color representation of the second color space and a fourth set of sample pixels according to a fourth electro-optical transfer function in the first color representation of a third color space such that the first set of sample pixels according to the first electro-optical transfer function includes a weighed combination of the third set of sample pixels according to the third electro-optical transfer function of the second color space and the fourth set of sample pixels according to the fourth electro-optical transfer function of the third color space.

15. The device of claim 14, wherein the electronic processor is configured to convert the fourth electro-optical transfer function of the third color space to a container of the first electro-optical transfer function in the first color representation of the first color space.

16. The device of claim 13, wherein the electronic processor is configured to convert the third electro-optical transfer function in the first color representation of the second color space to a container of the first electro-optical transfer function in the first color representation of the first color space.

17. The device claim 1, wherein the device is an encoder or a decoder.

18. A method for determining a backward reshaping function, comprising:
   determining a set of sample pixels from received video data;
   defining, from the set of sample pixels, a first set of sample pixels according to a first electro-optical transfer function in a first color representation of a first color space;
   converting the first set of sample pixels according to the first electro-optical transfer function to a second electro-optical transfer function in the first color representation of the first color space via a mapping function,
   producing, from the first set of sample pixels, a second set of sample pixels according to the second electro-optical transfer function;
   converting the first set of sample pixels and the second set of sample pixels from the first color representation to a second color representation of the first color space, and
   determining a backward reshaping function based on the converted first set of sample pixels and the converted second set of sample pixels wherein determining the backward reshaping function includes repeatedly applying and adjusting a sample backward reshaping function so as to minimize a difference between predicted pixel values obtained by applying the sample backward reshaping function to the pixels in the converted first set of sample pixels and, and the pixels in the converted second set of sample pixels,
   wherein converting the first set of sample pixels according to the first electro- optical transfer function to the second electro-optical transfer function via the mapping function includes applying a signal legalization function to the first set of sample pixels for forcing a range of the first set of sample pixels to be within a predetermined range.

19. The method of claim 18, wherein the signal legalization function is one of
   a clipping function comprising clipping the sample pixels of the first set outside the predetermined range,
   a piecewise linear function, or
   a sigmoid curve function.

20. The method of claim 18, wherein the first electro-optical transfer function is hybrid log gamma.

21. The method of 18, wherein the second electro-optical transfer function is a perceptual quantizer.

22. The method of claim 18, wherein defining the first set of sample pixels according to the first electro-optical transfer function includes
   producing, from the set of data pixels, a third set of sample pixels according to a third electro-optical transfer function in the first color representation of a second color space, and
   producing the first set of sample pixels according to the first electro-optical transfer function based on the third set of sample pixels according to the third electro-optical transfer function in the second color space, wherein the second color space is smaller than the first color space.

23. The method of claim 22, wherein defining the first set of sample pixels according to the first electro-optical transfer function includes interpolating the third set of sample pixels according to the third electro-optical transfer function in the first color representation of the second color space and a fourth set of sample pixels according to a fourth electro-optical transfer function in the first color representation of a third color space such that the first set of sample pixels according to the first electro-optical transfer function includes a weighed combination of the third set of sample pixels according to the third electro-optical transfer function of the second color space and the fourth set of sample pixels according to the fourth electro-optical transfer function in the third color space.

24. The method of claim 23, further comprising converting the fourth electro-optical transfer function of the third color space to a container of the first electro-optical transfer function in the first color representation of the first color space.

25. The method of claim 22, further comprising converting the third electro-optical transfer function of the first color representation of the second color space to a container of the first electro-optical transfer function in the first color representation of the first color space.

26. The method of claim 18, wherein the predicted values of the sample backward reshaping function are determined by applying a predictor for minimizing a mean squared error.

27. A non-transitory computer-readable medium storing instructions that, when executed by a processor of a computer, cause the computer to perform a method according to claim 18.

* * * * *

UNITED STATES PATENT AND TRADEMARK OFFICE
CERTIFICATE OF CORRECTION

PATENT NO. : 11,895,416 B2
APPLICATION NO. : 17/630901
DATED : February 6, 2024
INVENTOR(S) : Guan-Ming Su et al.

It is certified that error appears in the above-identified patent and that said Letters Patent is hereby corrected as shown below:

In the Claims

Column 26, Line 61, in Claim 8, delete "qiik," and insert --$q_{ijk}$,--

Column 27, Line 6, in Claim 10, after "of", insert --:--

Column 27, Line 18, in Claim 13, after "includes", insert --:--

Column 27, Line 54, in Claim 17, before "claim 1,", insert --of--

Column 28, Line 18, in Claim 18, delete "electro- optical" and insert --electro-optical-- therefor Column 28, Line 25, in Claim 19, after "of", insert --:--

Column 28, Line 32, in Claim 21, after "method of", insert --claim--

Column 28, Line 36, in Claim 22, after "includes", insert --:--

Signed and Sealed this
Nineteenth Day of November, 2024

Katherine Kelly Vidal
*Director of the United States Patent and Trademark Office*